United States Patent
Chung et al.

(10) Patent No.: US 6,265,493 B1
(45) Date of Patent: Jul. 24, 2001

(54) POLYOLEFIN GRAFT COPOLYMERS DERIVED FROM LINEAR COPOLYMERS OF ALPHA-OLEFINS AND DIVINYLBENZENE HAVING NARROW MOLECULAR WEIGHT AND COMPOSITION DISTRIBUTIONS AND PROCESS FOR PREPARING SAME

(75) Inventors: Tze-Chiang Chung; Jinyong Dong, both of State College, PA (US)

(73) Assignee: The Penn State Research Foundation, University Park, PA (US)

( * ) Notice: Subject to any disclaimer, the term of this patent is extended or adjusted under 35 U.S.C. 154(b) by 0 days.

(21) Appl. No.: 09/573,737

(22) Filed: May 18, 2000

Related U.S. Application Data

(63) Continuation-in-part of application No. 09/359,345, filed on Jul. 21, 1999, now Pat. No. 6,096,849.

(51) Int. Cl.$^7$ .................................................. C08F 255/06
(52) U.S. Cl. .......................... 525/247; 525/184; 525/186; 525/189; 525/190; 525/245; 525/279; 525/289; 525/296; 525/301; 525/310; 525/313; 525/319; 525/320; 525/322; 525/324; 525/332.2; 525/360; 525/384; 525/385; 525/386; 526/336
(58) Field of Search .................................. 526/126, 160, 526/170, 336; 525/184, 186, 189, 190, 245, 247, 279, 289, 296, 301, 310, 313, 319, 320, 322, 324, 332.3, 360, 384, 385, 386, 332.2

(56) References Cited

U.S. PATENT DOCUMENTS

| | | | |
|---|---|---|---|
| 3,265,765 | 8/1966 | Holden et al. | 260/876 |
| 3,658,770 | 4/1972 | Longi et al. | 260/79.5 P |
| 3,887,650 | 6/1975 | Agouri et al. | 260/878 B |
| 5,866,659 | 2/1999 | Chung et al. | 525/279 |
| 4,174,358 | 11/1979 | Epstein | 525/183 |
| 4,299,931 | 11/1981 | Coran et al. | 525/95 |
| 4,340,705 | 7/1982 | Lai et al. | 526/139 |
| 4,366,296 | 12/1982 | Kitagawa et al. | 526/77 |
| 4,530,914 | 7/1985 | Ewen et al. | 501/113 |
| 4,542,199 | 9/1985 | Kaminsky et al. | 526/160 |

(List continued on next page.)

FOREIGN PATENT DOCUMENTS

| | | |
|---|---|---|
| 0 559 108 A1 | 9/1993 | (EP) . |
| 62-241907 | 10/1987 | (JP) . |
| 0315431 A2 | 11/1988 | (JP) . |
| 05017539 | 1/1993 | (JP) . |
| 05194665 | 8/1993 | (JP) . |
| 05194666 | 8/1993 | (JP) . |
| 03255114 | 11/1994 | (JP) . |
| 08003231 | 1/1996 | (JP) . |
| 08003232 | 1/1996 | (JP) . |

OTHER PUBLICATIONS

Chinsrikul, et al, *J. Thermoplastic Comp. Mat.*, vol. 6, pp. 18–28 (1993).
Koo, et al, *Macromolecules*, vol. 32, pp. 981–988 (1999).
Fu, et al., *J. Am. Chem. Soc.*, vol. 117, pp. 10747–10748 (1995).

(List continued on next page.)

*Primary Examiner*—Fred Teskin
(74) *Attorney, Agent, or Firm*—Thomas J. Monahan

(57) ABSTRACT

The invention relates to a process for preparing polyolefin graft copolymers (II)

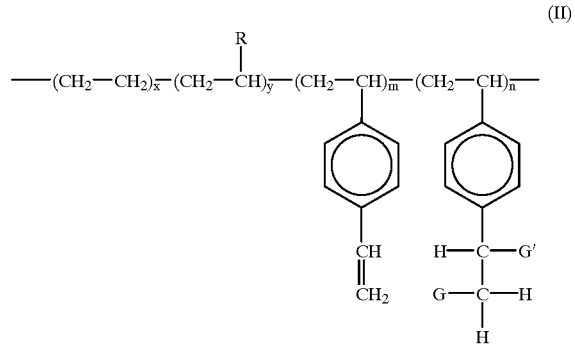

from linear and well defined polyolefin copolymers (I)

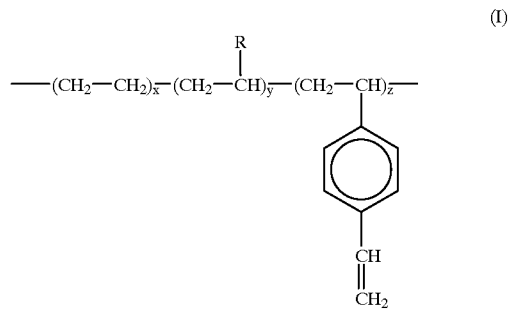

containing divinylbenzene comonomer units, wherein R, in formulas I and II, is a $C_1$ to $C_{10}$ linear or branched alkyl group or a $C_6$ to $C_{10}$ substituted or unsubstituted aromatic group; and wherein G and G', independantly, are selected from —H, —OH, epoxy, —NH$_2$, —COOH, anhydride, —Cl, —Br, —M, —COOM (M=metal, e.g., Li, Na, K and Ca) or a polymer chain having the molecular weight of at least about 500, which can be derived from both step and chain polymerization reactions. G and G' can be selected singly or in a combination of two or more thereof. In the graft copolymer composition, the combined alpha-olefin mole .% (x+y) is from about 50 to 99.9 mole %. Preferably, x+y is from 85 to 99.9 mole %, and most preferably x+y is from 95 to 99.9 mole %. The sum of x, y, m and n is 100%, and n is at least 0.05%. The molecular weight of backbone polymer chain has a number average molecular weight (Mn) of at least about 1,000, and preferably at least about 10,000.

23 Claims, No Drawings

U.S. PATENT DOCUMENTS

| | | | |
|---|---|---|---|
| 4,551,503 | 11/1985 | Lai et al. | 525/332.1 |
| 4,665,047 | 5/1987 | Slaugh et al. | 502/108 |
| 4,680,318 | 7/1987 | Fujii et al. | 521/95 |
| 4,734,472 | 3/1988 | Chung | 526/239 |
| 4,751,276 | 6/1988 | Chung | 526/158 |
| 4,752,597 | 6/1988 | Turner | 502/104 |
| 4,812,529 | 3/1989 | Chung | 525/326.1 |
| 4,877,846 | 10/1989 | Chung | 525/369 |
| 4,946,899 | 8/1990 | Kennedy et al. | 525/244 |
| 5,026,798 | 6/1991 | Canich | 526/127 |
| 5,272,236 | 12/1993 | Lai et al. | 526/348.5 |
| 5,286,800 | 2/1994 | Chung et al. | 525/288 |
| 5,401,805 | 3/1995 | Chung et al. | 525/288 |
| 5,504,171 | 4/1996 | Etherton et al. | 526/336 |
| 5,543,484 | 8/1996 | Chung et al. | 526/347.1 |
| 5,608,009 | 3/1997 | Machida et al. | 525/247 |
| 5,703,187 | 12/1997 | Timmers | 526/282 |

OTHER PUBLICATIONS

Koo, et al, *J. Am. Chem. Soc.,* vol. 120, pp. 4019–4020 (1998).

Mulhaupt, et al, *Polymers for Advanced technologies,* vol. 4, pp. 439–449 (1993).

Chung, et al, *Polymer,* vol. 38, No. 6, pp. 1495–1502 (1997).

Lu, et al, *Macromolecules,* vol. 31, No. 17, pp. 5943–5946 (1998).

Lu, et al, *Macromolecules,* vol. 32, No. 8, pp. 2525–2533 (1999).

Chung, et al, *Macromolecules,* vol. 26, No. 14, pp. 3467–3471 (1993).

Cohen, et al, *Macromol. Chem.,* vol. 15, pp. 370–375 (1982).

Doi, et al, *Makromol. Chem.,* vol. 186, pp. 11–15 (1985).

Yasuda, et al, *Macromolecules,* vol. 25, pp. 5115–5116 (1992).

Drzewinski, et al, *J. Polym. Sci., Part A: Polym Chem.,* vol. 24, pp. 2457–2466 (1986).

Mulhaupt, et al, *Makromol. Chemm Macromol. Symp.,* vol. 48/49, pp. 317–332 (1991).

Doi, et al, *Advanced Polym. Sci.,* vol. 73/74, pp. 201–248 (1989).

Lee, et al, *Polymer,* vol. 35, No. 14, pp. 2980–2984 (1994).

Chung, et al, *Macromolecules,* vol. 27, No. 6, pp. 1313–1319 (1994).

Chung, et al, *J. Polym. Sci.: Part A: Polym. Chem.,* vol. 36, pp. 1017–1029 (1998).

Lu, et al, *Macromolecules,* vol. 31, No. 7, pp. 2028–2034 (1998).

Marathe, et al, *Macromolecules,* vol. 27, pp. 1083–1086 (1994).

Kitagawa, et al, *Polymer Bulletin,* vol. 10, pp. 109–113 (1983).

Ver Strate, et al, *Encyclopedia of Polym. Sci. and Eng.,* vol. 6, pp. 522–563 (1986).

Bruzzone, et al, *Makromol. Chem.,* vol. 179, pp. 2173–2185 (1978).

Cucinella, et al, *European Polymer Journal,* vol. 12, pp. 65–70 (1976).

Aaltonen, et al, *Macromolecules,* vol. 27, pp. 3136–3138 (1994).

Soga, *Macromolecules,* vol. 22, No. 7, pp. 2875–287 (1989).

Miyatake, et al, *Makromol. Chem. Macromol. Symp.,* vol. 66, pp. 203–215 (1993).

POLYOLEFIN GRAFT COPOLYMERS DERIVED FROM LINEAR COPOLYMERS OF ALPHA-OLEFINS AND DIVINYLBENZENE HAVING NARROW MOLECULAR WEIGHT AND COMPOSITION DISTRIBUTIONS AND PROCESS FOR PREPARING SAME

RELATED APPLICATION

This application is a continuation-in-part of Ser. No. 09/359,345, filed on Jul. 21, 1999, now U.S. Pat. No. 6,096,849.

FIELD OF THE INVENTION

The invention relates to a process for preparing polyolefin graft copolymers containing polyolefin backbone and pendant polymer side chains derived from both chain and step growth polymerization reactions. The process includes functionalization and graft copolymerization reactions utilizing linear copolymers of alpha-olefins and divinylbenzene, which have been prepared using certain metallocene catalysts, which have narrow molecular weight and composition distributions, and which range from semicrystalline thermoplastics to amorphous elastomers, to form olefin/divinylbenzene copolymers having pendant styrene units.

BACKGROUND OF THE INVENTION

Although useful in many commercial applications, polyolefin homopolymers, such as high density polyethylene (HDPE) and isotactic polypropylene (i-PP), suffer poor interaction with other materials. The inert nature of polyolefins significantly limits their end uses, particularly those in which adhesion, dyeability, paintability, printability or compatibility with other functional polymers is paramount.

Unfortunately, because of their inert nature and crystallinity, polyolefins have been among the more difficult materials to chemically modify by means of post-polymerization processes. In many cases, the post-polymerization reactions result in serious side reactions, such as degradation and crosslinking reactions. Although the direct copolymerization is the most effective route to functionalize polyolefins, such direct processes usually are laden with difficulties and limitations.

Only the transition metal coordination catalysts (Ziegler-Natta and metallocene catalysts) can be used in the preparation of linear polyolefins, and it normally is difficult to incorporate functional group-containing monomers into the polyolefins by using the early transition metal catalysts due to catalyst poisoning (see J. Boor, Jr., *Ziegler-Naaa Catalysts and Polymerizations*, Academic Press, New York, 1979). The Lewis acid components (Ti, V, Zr and Al) of the catalyst will tend to complex with nonbonded electron pairs on N, O, and X (halides) of functional monomers in preference to complexation with the electrons of the double bonds. The net result is the deactivation of the active sites by formation of stable complexes between catalysts and functional groups, thus inhibiting polymerization.

In several prior art disclosures, it has been taught to prepare reactive polyolefin copolymers containing either borane (see U.S. Pat. Nos. 4,734,472; 4,751,276; 4,812,529; 4,877,846) or p-methylstyrene (see U.S. Pat. Nos. 5,543, 484; 5,866,659 and 6,015,862; and *J. Polym. Sci. Polym Chem.*, 36, 1017, 1998; *J. Polym. Sci. Polym Chem.*, 37, 2795, 1999; and *Macromolecules*, 31, 2028, 1998) reactive comonomer units. The chemistry disclosed in this prior art involves the direct copolymerization of alpha-olefins and organoborane-substituted monomers and p-methylstyrene, respectively, with Ziegler-Natta and metallocene catalysts. The homo- and copolymers containing reactive borane or p-methylstyrene groups are very useful intermediates for preparing a series of functionalized polyolefins. Many new functionized polyolefins with various molecular architectures have been obtained based on this chemistry. In addition, it has been demonstrated that polar groups can improve the adhesion of polyolefins to many substrates, such as metals and glass (see Chung et al, *J. Thermoplastic Composite Materials*, 6, 18, 1993 and *Polymer*, 35, 2980, 1994). The application of both borane-containing polymers and p-methylstyrene-containing polymers also has been extended to the preparation of polyolefin graft copolymers, which involves free radical (see U.S. Pat. Nos. 5,286,800 and 5,401,805; Chung et al, *Macromolecules*, 26, 3467, 1993; and Chung et al, *Macromolecules*, 32, 2525, 1999) and anionic graft-from reactions (see Chung et al, *Macromolecules*, 30, 1272, 1997), respectively. In polymer blends, compatibility of the polymers can be improved by adding a suitable polyolefin graft copolymer which reduces the domain sizes and increases the interfacial interaction between domains.

Another approach toward preparing functionalized polyolefins is the preparation of unsaturated polyolefin copolymers containing pending unsaturated side chains which are reactive in subsequent chemical functionalization reactions. In general, the transition metal (Ziegler-Natta and metallocene catalysts) copolymerization of alpha-olefin and diene monomer is a great concern with many potential side reactions. The diene monomer, containing two reactive sites, potentially may engage in a double addition reaction to form copolymers having long branching side chains or even three dimensional network (crosslinked) structures. Most of linear diene-containing copolymers that have been reported involve the use of asymmetric dienes (see U.S. Pat. Nos. 3,658,770; 4,680,318; and 4,366,296) which contain only one polymerizable olefin unit, either an alpha-olefin or a constrained cycloolefin moiety, to prevent the formation of crosslinked (unprocessible) products. The asymetric dienes include those containing an alpha-olefin unit and an internal olefin unit, such as 1,4-hexadiene and methyl-1,4-hexadiene, and those containing a constrained cycloolefin unit and a linear olefin unit, such as 2-methylene-5-norborene, 5-vinyl-2-norborene and dicyclopentadiene. Several unsaturated polyolefins have been reported, including unsaturated polyethylene copolymers (Marathe et al. *Macromolecules*, 27, 1083, 1994), polypropylene copolymers (Kitagawa et al., *Polymer Bulletin*, 10, 109, 1983) and ethylene-propylene terpolymers (VerStrate et al, *Encyclopedia of Polym. Sci. and Eng.*, 6, 522, 1986). Recently, Machida et al. (JP 05-194665 and JP 05-194666) also reported the copolymerization of alpha-olefins and asymetric styrenic diene comonomers, such as p-(3-butenyl) styrene, to produce linear copolymers using Ziegler-Natta heterogeneous catalysts.

Alpha-olefin polymerization involving symmetric alpha, omega-diene comonomers in which both double bonds are terminal alpha-olefins are very limited. One such polymerization, which involved the copolymerization of alpha-olefin and 1,3-butadiene (Bruzzone et al., *Makromol. Chem.*, 179, 2173, 1978; Cucinella et al., *European Polym. J.*, 12, 65, 1976), resulted in copolymers where the butadiene units in the copolymer were mostly in the trans-1,4-configuration. In other words, both alpha-olefins in the butadiene monomer were engaged in the polymerization reaction. Some diene comonomers having a long spacer between two terminal olefins, including $C_8$–$C_{14}$ aliphatic alpha,omega-dienes, such as 1,7-octadiene, 1,9-decadiene, 1,11-dodecadiene and 1,13-tetradecadiene (see U.S. Pat. Nos. 4,551,503; 4,340,705; and 5,504,171), were found to be more selective so as to engage only one olefin group in the heterogeneous Ziegler-Natta copolymerization reaction. The resulting polyolefin copolymers have pending alpha-olefin groups located along the polymer chain.

Incorporating divinylbenzene (a symmetric alpha,omega-diene) comonomer into a linear polyolefin would result in polyolefin copolymers containing pending styrene groups, as illustrated below in Formula (I). Such copolymers could be used as versatile precursors for a broad range of polyolefin structures, including the polyolefin graft copolymers containing polyolefin backbone and other polymer side chains. However, it is very difficult to prepare linear polyolefin copolymers having a well-defined molecular structure, as illustrated in Formula (I), due to potential branching and crosslinking reactions, resulting from the difuntional nature of divinylbenzene.

The transition metal copolymerization of styrenic monomers and alpha-olefins usually is very difficult to accomplish (see Seppala et al., *Macromolecules*, 27, 3136, 1994 and Soga et al., *Macromolecules*, 22, 2875, 1989). This is especially true when using stereospecific heterogeneous Ziegler-Natta catalysts having multiple active sites, since the reactivity of monomer is sterically controlled, i.e., the larger the size of the monomer, the lower the reactivity; and those few styrenic copolymers that are known tend to be very inhomogeneous (Mijatake, et al., *Makromol. Chem. Macromol. Symp.*, 66, 203, 1993; Aaltonen, et al., *Macromolecules*, 27, 3136, 1994; and U.S. Pat. No. 5,543,484) and to have broad molecular weight and composition distributions (and even to include some homopolymer).

The copolymerization of alpha-olefin and divinylbenzene by Ziegler-Natta catalysts has been disclosed (Yokoyama, et al., Eur. Pat. Appl. 88310305.3 and Yoshitake, et al., JP 62-241907). It also has been disclosed that the resulting copolymers can be used in the preparation of polyolefin graft copolymers (Yokoyama, et al., JP 03-255114; Tomita, et al., JP 08-003231, JP 08-003232 and JP 05-017539). However, as expected, the known copolymers of divinylbenzene and alpha-olefins, especially ethylene and propylene, are very inhomogeneous, showing broad composition and molecular weight distribution (Mw/Mn>6), due to multiple active sites and sterically-controlled monomer reactivity. Also, the extent of side reactions has not been reported, possibly because it may be very difficult to determine the extent of side reactions due to the very low concentration of divinylbenezene in the copolymer products. The divinylbenzene content in the ethylene and propylene copolymers is below 0.3 mole % (1 wt %) and the overall divinylbenzene conversion is only few % in each case. In general, the catalyst activity is inversely proportional to the concentration of divinylbenzene in the monomer feed.

Machida, et al. (U.S. Pat. No. 5,608,009) also reported the copolymerization reaction of ethylene and diene comonomers (including divinylbenzene) by using metallocene catalysts. The diene-containing copolymers were used as intermediates in the preparation of graft copolymers, including long chain branching polyolefins. In general, the alpha-olefin/divinylbenzene copolymers reported by Machida, et al. were complex and had ill-defined molecular structures. Moreover, Machida, et al. failed to identify the reaction conditions that are necessary to prepare copolymers having a linear molecular structure and narrow composition and molecular weight distributions (as discussed in Column 16, lines 41–45, the olefin copolymers obtained by Machida, et al were long-branched copolymers). The disclosed examples of copolymerization reactions between ethylene and divinylbenzene involved using dicyclopentadienylzirconium dichloride (in Example 1) and cyclopentadienylzirconium trimethoxide (in Example 3) as the catalyst system. The molecular structures of the resulting ethyleneldivinylbenzene copolymers were complex and the copolymers were characterized by a low molecular weight (Mw=5,670 in Example 1 and Mw=14,500 in Example 3) and broad molecular weight distributions (Mw/Mn=6.6 in Example 1 and Mw/Mn=23 in Example 3). The inhomogeneous and non-linear copolymer structures were clearly revealed by the mole ratio of unsaturation/divinylbenzene (TUS/DOU) in the copolymers, the ratios being 0.71 (in Example 1) and 7.55 (in Example 3) using dicyclopentadienylzirconium dichloride and cyclopentadienyltitanium trimethoxide, respectively.

It is well known that metallocene polymerization results in polymers that are terminated mainly by beta-hydride elimination to form an unsaturated site at the chain end. Accordingly, it would be logical that the TUS/DOU mole ratio should be near unity for a linear copolymer of the type contemplated by the present invention, as illustrated in Formula (I). Thus, for a linear polymer, it would be expected that as the polymerization reaction continues and as the molecular weight increases (and as divinylbenzene units become incorporated into the copolymer), the contribution of chain end unsaturation to the TUS/DOU mole ratio would be very small. In other words, the TUS/DOU ratio should remain at or very close to unity. Similarly, it would be logical to assume that a copolymer that is characterized by a TUS/DOU ratio that deviates substantially from unity would be a non-linear, inhomogeneous copolymer containing many chain ends. For the known ethylene/divinylbenzene copolymers that were prepared using dicyclopentadienylzirconium dichloride (Example 1, above), the ratio of TUS/DOU=0.71 strongly suggests that a good portion of the divinylbenzene units that were incoporated into the copolymer had undergone double addition reactions at both vinyl groups to produce a polymer having a long-chain branching structure. Overall, the prior disclosures fail to identify the reaction conditions, especially the catalyst systems, that are necessary to prepare linear alpha-olefin/divinylbenzene copolymers having narrow composition and molecular weight distributions.

Machida, et al. (Eur. Pat. Appl. 93103181.9 (Pub. No. 0 559 108 A1)) also reported the application of the copolymerization adducts of alpha-olefin and diolefin comonomers (including divinylbenzene) for the preparation of graft copolymer containing syndiotactic polystyrene (s-PS) side chains. The results clearly demonstrated the disadvantages of using divinylbenzene as the diolefin unit under their reaction conditions. The problems include the formation of crosslinked product, difficulty in assuring sufficient reactivity and monomers remaining unreacted. In fact, the graft copolymers with much better quality were prepared by using other diolefin monomers.

In general, the advances in metallocene catalysts (see U.S. Pat. Nos. 4,542,199; 4530,914; 4,665,047; 4,752,597; 5,026, 798 and 5,272,236) provide an excellent opportunity for chemists to prepare new polyolefin polymers. With well-defined (single-site) catalysts and a designed active site geometry, monomer insertion can be controlled effectively, both kinetically and sterically, during a polymerization process. This is especially important for copolymerization reactions for producing copolymers having a relatively well-defined molecular structure. Several prior publications have disclosed the use of metallocene catalysts having a constrained ligand geometry for producing narrow composition distribution and narrow molecular weight distribution linear low density polyethylene (LLDPE).

For copolymerization reactions, use of a relatively opened active site metallocene catalyst provides essentially equal access for both comonomers, and the incorporation of higher molecular weight olefin comonomer is significantly higher than for those copolymers obtained from traditional Ziegler-Natta catalysts. In fact, some metallocene catalysts with constrained ligand geomety and opened active site have been shown to be effective for incorporation of styrenic monomers in polyolefin copolymers, including poly (ethylene-co-styrene) (U.S. Pat. No. 5,703,187), poly (ethylene-co-p-methylstyrene), poly(ethylene-ter-propylene-ter-p-methylstyrene) and poly(ethylene-ter-1-octene-ter-p-methylstyrene) (U.S. Pat. No. 5,543,484, and *J. Polym. Sci. Polym Chem.,* 36, 1017, 1998, *Macromolecules,* 31, 2028, 1998).

SUMMARY OF THE INVENTION

The invention relates to a process for process for preparing functionalized polyolefin graft copolymers represented by the structural Formula (II)

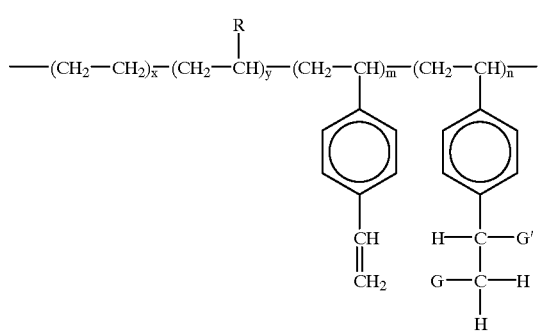

from linear and well defined polyolefin copolymers which contain divinylbenzene comonomer units and which may be represented by the Formula (I)

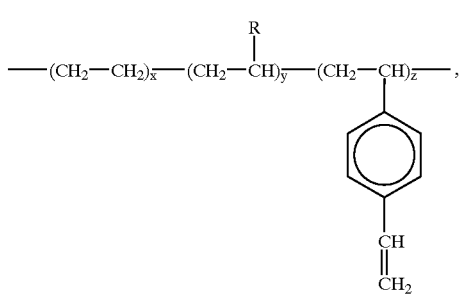

wherein R, in Formulas I and II, is a $C_1$ to $C_{10}$ linear or branched alkyl group or a $C_6$ to $C_{10}$ substituted or unsubstituted aromatic group, and preferably, a $C_1$ to $C_6$ alkyl group or a substituted or unsubstituted $C_6$ aromatic group, and wherein G and G', independantly, are selected from —H, —OH, epoxy, —NH$_2$, —COOH, anhydride, —Cl, —Br, —M, —COOM (M=metal, e.g., Li, Na, K and Ca) or a polymer chain having the molecular weight of at least about 500, which can be derived from both step and chain polymerization reactions. G and G' can be selected singly or in a combination of two or more thereof. In the graft copolymer composition, the combined alpha-olefin mole % (x+y) is from about 50 to 99.9 mole %. Preferably, x+y is from 85 to 99.9 mole %, and most preferably x+y is from 95 to 99.9 mole %. The sum of x, y,m and n is 100%, and n is at least 0.05%. The backbone polymer chain has a number average molecular weight (Mn) of at least about 1,000, and preferably at least about 10,000. Typically, the backbone polymer chain would have a number average molecular weight (Mn) of from about 20,000 to about 200,000.

In one aspect of the invention, applicants have discovered the reaction processes for producing functionalized polyolefins and graft copolymers (II) by the chemical reactions of pending styrene units in alpha-olefin/divinylbenzene copolymers (I), which have a linear molecular structure and narrow molecular weight and composition distributions. The linear copolymers have monomer units represented by the structural formula,

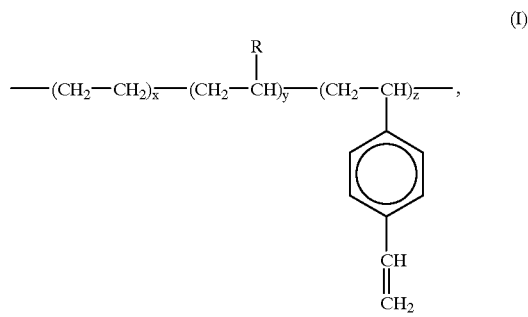

in which R is an alkyl group, or a cyclic aliphatic or aromatic group. Preferably, R is $C_1$ to $C_{10}$ linear or-branched alkyl group, or a $C_6$ to $C_{10}$ substituted or unsubstituted aromatic group, and most preferably, a $C_1$ to $C_6$ alkyl group or a substituted or unsubstituted $C_6$ aromatic group. In the copolymer composition, the combined alpha-olefin mole % (x+y) is from about 50 to 99.9 mole %. Preferably, x+y is from 85 to 99.9 mole %, and most preferably x+y is from 95 to 99.9 mole %. The sum of x, y and z (mole % of divinylbenzene) is 100%. The copolymer I has a number average molecular weight (Mn) of at least about 1,000, to preferably at least about 10,000 (typically from at least about 20,000). The copolymers also preferably have a ratio of weight average molecular weight (Mw) to number average molecular weight, or Mw/Mn, less than about 4. Preferably, Mw/Mn is less than 3. Furthermore, the copolymers have narrow composition distribution with the incorporated divinylbenzene units homogeneously distributed along all the polymer chains.

The pendant styrene groups in the polyolefin copolymer (I) are very versatile, and can be converted to functional (polar) groups, such as —OH, epoxy, —NH$_2$, —COOH, anhydride, —Cl, —Br, —M, —COOM (M=metal, e.g. Li,Na, K and Ca), by conventional organic olefinic chemistry. The resulting converted copolymer contains pendant functional groups, which can further serve as the coupling sites for reacting with a polymer having a terminal reactive group to form a graft copolymer (II). With the careful selection of a coupling pair, a coupling reaction can take place effectively in solution or melt. A coupling reaction also can be accomplished during a reactive extrusion process. Furthermore, it is very convenient to prepare graft copolymer (II) by using the pendant styrene groups in the polyolefin copolymer (I) as a monomer unit in a subsequent polymerization process. In other words, a second copolymerization reaction involving copolymer (I) and olefinic monomers can take place via either a graft-onto or a graft-through process to produce graft copolymer (II), containing polyolefin backbone and several pendant polymer side chains.

DETAILED DESCRIPTION

This invention is an extension of our previous discovery that with certain metallocene catalysts an effective copolymerization reaction of alpha-olefin and divinylbenzene can take place to produce alpha-olefin/divinylbenzene copolymers (I) in which the unsaturation/divinylbenzene (TUS/DOU) mole ratio is near unity, typically between 0.8 and 1.1. Preferably, the TUS/DOU mole ratio is between 0.9 and 1, and most preferably mole ratio is between 0.95 and 1. The copolymers (I) are free from any detectable branching or crosslinking structures, and they are completely soluble and processible. The copolymers (I) comprise the direct copolymerization product of alpha-olefin having from 2 to 12 carbon atoms and divinylbenzene and are high molecular weight linear copolymers having a substantially homogeneous molecular structure, i.e. narrow molecular weight and composition distributions. The copolymer (I) may be represented by the formula illustrated below:

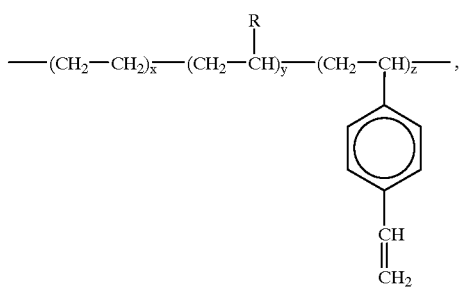

(I)

in which R is an alkyl group, or a cyclic aliphatic or aromatic group. Preferably, R is $C_1$ to $C_{10}$ linear or branched alkyl group, or a $C_6$ to $C_{10}$ substituted or unsubstituted aromatic group, and most preferably, a $C_1$ to $C_6$ alkyl group or a substituted or unsubstituted $C_6$ aromatic group. In the copolymer composition, x is $\geq 0$, y is $\geq 0$, and typically one of x or y is greater than 40 mole %. In many preferable cases, one of x or y is greater than 60%. The combined alpha-olefin mole % (x+y) is from about 50 and 99.9% (e.g., from 85 and 99.9%), and preferably x+y is from 95 and 99.9 %. The sum of x, y and z (mole % of divinylbenzene) is 100%. The copolymer (I) has a number average molecular weight (Mn) of at least about 1,000, and preferably at least about 10,000. Typically, the copolymers have a number average molecular weight of from about 20,000 up to about 200,000. The copolymers also preferably have a molecular weight distribution (ratio of weight average molecular weight (Mw) to number average molecular weight (Mn), or Mw/Mn) of less than about 4. Preferably, Mw/Mn is less than 3, for example, from about 1.9 to about 2.8. Furthermore, the copolymers have a narrow composition distribution with the incorporated divinylbenzene units homogeneously distributed along all of the copolymer chains.

As disclosed in our earlier application, the copolymers (I) may be prepared by contacting the alpha-olefin and divinylbenzene comonomers under copolymerization reaction conditions in the presence of a single-site metallocene catalyst having substituted covalently-bridged ring ligands and a specific opening at the metal active site, as illustrated below:

$\phi = \angle L - M - L'$ where M is a transition metal of group 3 or group 4 of the Periodic Table of the Elements; L and L', independantly, are selected from —NR'—, —PR'—, cyclopentadienyl or substituted cyclopentadienyl groups bound in an $\eta^5$ bonding mode to M, wherein at least one of L and L' is a cyclopentadienyl or a substituted cyclopentadienyl group, and wherein each occurrence of R', independantly, is selected from the group consisting of hydrogen, alkyl, aryl, silyl, halogeneated alkyl, halogenated aryl, and mixtures thereof; Y is a moiety selected from —SiR'$_2$—, —CR'$_2$—, and —CR'$_2$—CR'$_2$—; X is selected from hydride, halo, alkyl, aryl, aryloxy, and alkoxy; and n is 0, 1 or 2; and the angle, $\phi$, formed at the metal center between two L and L' ligands, such as the centroid of two cyclopentadienyl or substituted cyclopentadienyl groups, is between 135° and 105°. Preferably, the value of $\phi$ is between 130° and 115°, and most preferably, the value of $\phi$ is between 128° and 120°. The metallocene catalysts are known to be activated with a cocatalyst, such as methylalumoxane (MAO) and tris (pentafluorophenyl) borane. The amount of such catalysts employed will depend on the desired molecular weight and the desired molecular weight distribution of the copolymer being produced, but will generally range from about 20 ppm to 1 wt. %, and preferably from about 0.001 to 0.2 wt. %, based upon the total amount of monomer to be polymerized therein.

The constrained ligand geometry associated with the covalently-bridged ligands results in a specific space opening at the metal active site, which provides the selective reaction with only one of the two vinyl groups in divinylbenzene during the copolymerization between alpha-olefins and divinylbenzene. In other words, the catalysts contemplated for use in the present invention can effectively incorporate divinylbenzene into the copolymer chain through single enchainment, but show poor reactivity to the styrenic units already existing in the copolymer (I). The selective copolymerization of divinylbenzene is illustrated below.

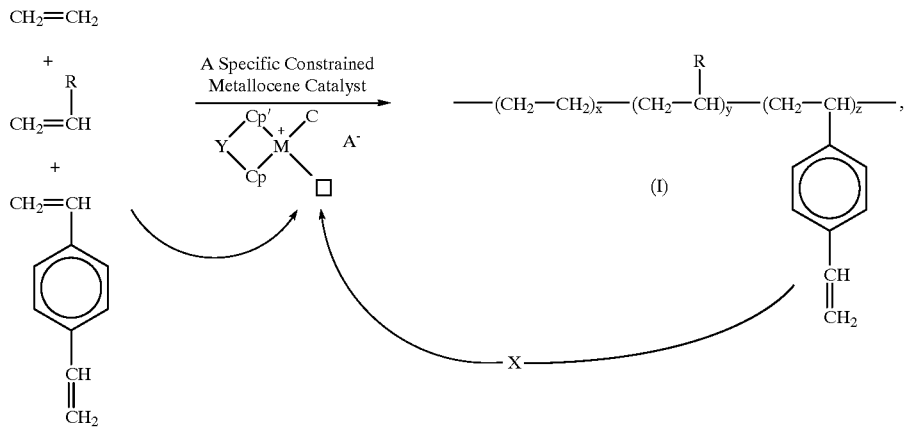

Since only one vinyl group in the divinylbenzene monomer is involved in the copolymerization reaction, the side reactions (described in the prior art) involving pendant styrene vinyl groups in the copolymer (I) and producing branched polymers or crosslinked polymers can be avoided. The resulting copolymer (I) is a linear soluble polymer having an unsaturation/divinylbenzene (TUS/DOU) mole ratio near unity, e.g., from about 0.8 to 1.1. In addition, the catalytic sites having favorable divinylbenzene incorporation (involving only a single vinyl group) results in linear copolymers having a broad range of divinylbenzene contents and narrow molecular weight and composition distributions.

Suitable diluents for the monomers, catalyst components and polymeric reaction products include the general group of aliphatic and aromatic hydrocarbons, used singly or in a mixture, such as propane, butane, pentane, cyclopentane, hexane, toluene, heptane, isooctane or the like. The processes of the present invention can be carried out in the form of a slurry of polymer formed in the diluents employed, or as a homogeneous solution process, depending on the alpha-olefin used. The use of a slurry process is, however, preferred, since in that case lower viscosity mixtures are produced in the reactor, and slurry concentrations up to 40 wt. % of polymer are possible. At higher slurry concentrations it is possible to operate a more efficient process in which it is necessary to recycle less of the reactants and diluent for each unit of polymer produced.

In general, the polymerization reactions of the present invention are carried out by mixing divinylbenzene and alpha-olefin (ethylene and propylene with constant pressure) in the presence of the catalyst and diluent in a reactor, with thorough mixing, and under copolymerization conditions, including means for controlling the reaction temperature to between about 0 and 80° C. In particular, the polymerization may be carried out under batch conditions, such as in an inert gas atmosphere and in the substantial absence of moisture. Preferably, the polymerization is carried out continuously in a typical continuous polymerization process with inlet pipes for monomers, catalysts and diluents, temperature sensing means, and an effluent overflow to a holding drum or quench tank. The overall residence time can vary, depending upon, e.g., catalyst activity and concentration, monomer concentration, reaction temperature, monomer conversion and desired molecular weight, and generally will be between about thirty minutes and five hours, and preferably between about 1 and 2 hours.

The resulting copolymers typically would be weighed and analyzed by nuclear magnetic resonance (NMR), differential scanning calorimetry (DSC) and gel permeation chromatography (GPC) to determine the monomer conversion, copolymer composition, thermal transition temperature and molecular weight, respectively.

The extent of double enchainment can be quantified by $^1$H NMR spectrum to determine the unsaturation/divinylbenzene (TUS/DOU) mole ratio of the copolymer. Thus, for a linear copolymer of the Formula (I), without any double enchainment at the incorporated divinylbenzene units, a $^1$H NMR spectra would show four chemical shifts near 5.3, 5.8, 6.8 and 7.0–7.4 ppm (with the integrated peak intensity ratio=1:1:1:4), corresponding to three individual vinyl protons and four aromatic protons in the pending styrene unit. One can also observe a small peak at 4.7 ppm in low molecular weight copolymers, due to the terminal vinyl group at the chain end. In most high molecular weight copolymer cases, the terminal vinyl group is less than 10% of the vinyl groups derived from divinylbenzene units. Therefore, the mole ratio of unsaturation/divinylbenzene (TUS/DOU) in the linear alpha-olefin copolymers of this invention is always near unity (typically from about 0.8 to 1.1). A significant deviation of this peak intensity mole ratio from unity indicates the extent of double bond enchainment in the incorporated divinylbenzene units, which results from branching and/or crosslinking in the copolymer. As will be seen in the examples hereinbelow, a good correlation was observed between the reduction of TUS/DOU ratio and the reduction of copolymer processibility (solubility), due to the presence of crosslinking in certain copolymers. In further connection with TUS/DOU ratios, it will be appreciated that a high TUS/DOU ratio (considerably higher 1) will be observed for low molecular weight copolymers which do not have any divinylbenzene units and have only a terminal vinyl group. On the other hand, a low TUS/DOU ratio (considerably lower than 1) would be observed if a significant portion of the divinylbenzene units incorporated in the copolymer engaged in double enchainment to produce a copolymer having a long-chain branched structure.

One major advantage of the alpha-olefin and divinylbenzene copolymers (I) is the existence of numerous pendant styrene groups along the backbone. The pendant styrene groups are very reactive in many chemical reactions, including free radical, cationic, anionic and transition metal coordination reactions, and can serve as the reactive sites for selective functionalization reactions to produce functionalized polyolefins, or they can serve as the monomers for subsequent graft reactions which produce polyolefin graft copolymers having polyolefin backbone and other polymer side chains. It will be apparent that the reactivity of the functionalized copolymers enables subsequent derivatization reactions to considerably broaden the copolymer composition and structures that can be achieved.

The functionalized polyolefins and graft copolymers of the present invention may be represented by the Formula (II), illustrated below:

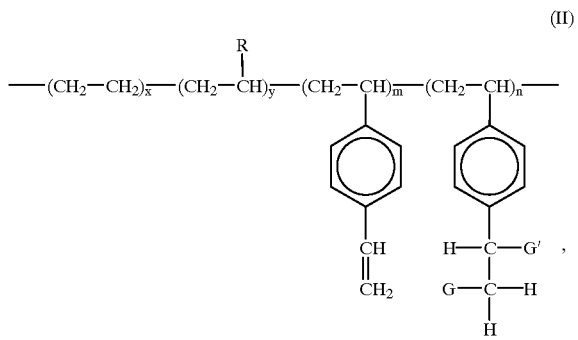

(II)

in which R is defined above in connection with Formula (I). G and G', independently, are selected from —H, —OH, epoxy, —NH$_2$, —COOH, anhydride, —Cl, —Br, —M, —COOM (M=metal, e.g. Li, Na, K and Ca) or a polymer chain having a molecular weight of at least about 500, which can be derived from both step and chain polymerization reactions; x and y are as previously defined in connection with Formula (I); m is the mole % of divinylbenzene units remaining in the functionalized copolymer; n is the mole % of functionalized styrenic units and is at least 0.05% (preferably at least 0.1%); and the sum of x, y, m and n is 100%. As indicated in connection with Formula (I), the combined alpha-olefin mole % (x+y) in the functionalized copolymer (Formula (II)) is from about 50 and 99.9%. Preferably, x+y is greater than 60% and is from 85 to 99.9%, and most preferably x+y is from 95 to 99.9%. The backbone polymer chain (Formula (I)) has a number average molecular weight (Mn) of at least about 1,000, and preferably at least about 10,000.

The functionalization reactions of alpha-olefin/divinylbenzene copolymer (I) involve conventional organic olefinic chemistry, which can be run in bulk, finely dispersed slurry solution, or homogeneous polymer solution. Usually, bulk reactions also can be effective in an extruder, or other internal mixer, suitably modified to provide adequate mixing. The details of such bulk processes are set forth, for example, in U.S. Pat. No. 4,548,995, the disclosure of which is incorporated herein by reference. Solution processes are advantageous in that they permit good mixing and an ability to control reaction conditions more easily. Solution processes also facilitate the removal of undesired by-products. A disadvantage of solution processes is the need for removing residual unreacted divinylbenzene prior to chemical modification reactions.

Some resulting functional polyolefins contain several pendant functional groups, such as —OH, epoxy, —NH$_2$, —COOH, anhydride, —Cl, —Br, that are very reactive in subsequent coupling reactions with a polymer having a terminal reactive group to form graft copolymer (II). The coupling reaction can be carried out in solution or melt, and it can be accomplished during a reactive extrusion process. One example of such a coupling reaction between a polyolefin (such as PP) containing pendant succinic anhydride groups and a polyamide (such as Nylon 6) having a terminal —NH$_2$ group. The resulting PP-g-Nylon contains phenyl-succinimide linkages between two types of polymer chains. Another example is the coupling reaction is the reaction between a polyolefin (such as PE) containing pendant succinic anhydride groups and a poly(ethylene glycol) methyl ether having a terminal —OH group. The resulting PE-g-PEO graft copolymer contains phenylester linkages.

In preferred aspects of the invention, the pending styrene moieties in alpha-olefin/divinylbenzene copolymers (I) serve as monomer units in a subsequent graft reaction with other olefinic monomers. The pendant styrene moieties, resemble a styrene monomer in that they are very reactive in many chain polymerization reactions, including free radical, cationic, anionic and transition metal coordination polymerization reactions. In the presence of olefinic monomers, alpha-olefin/diviylbenzene copolymers (I) and catalyst, a graft polymerization reaction takes place involving the pendant styrene groups in the alpha-olefin/diviylbenzene copolymer to form the graft copolymer (II). Most graft reactions take place in homogeneous solution or finely dispersed slurry solution.

In the case of an anionic graft reaction, the preferred process would begin with a metallation reaction of copolymer (I) with alkyllithium (such as n-BuLi) to form a polyolefin containing pendant benzylic anions. By limiting the amount of alkyllithium added to the reaction to an amount less than would be required to react with all of the divinylbenzene units in the copolymer (I), the metallation reaction between styrene and alkyllithium will be quantitative. In other words, no purification will be needed before adding an anion-polymerizable monomer to continue the living anionic graft-from polymerization process. Preferred anion-polymerizable monomers include, for example, vinyl aromatic compounds, such as styrene and alkyl substituted styrene, vinyl saturated amides such as acrylarmides, alkyl acrylates and methacrylates, methacrylonitrile, acrylonitrile, vinyl pyridines and conjugated dienes, such as isoprene and butadiene, and their mixtures. With the coexistence of polymeric anions and monomers susceptible to anionic polymerization, living anionic polymerization takes place, as is described, for example, by R. Milkovich et al in U.S. Pat. No. 3,786,116. It is important to note that the anionic polymerization of various monomers, such as methyl methacrylate, can take place at room temperature without causing any detectable side reactions, which may be associated with the stable benzylic anion initiator. After achieving the desired composition of the graft copolymer, the graft-from reaction can be terminated by adding a proton source, e.g., an alcohol such as methanol or isopropanol, or other conventional polymerization terminator to the reaction mass. In addition, the living anionic chain ends can be converted to a variety of functional groups by controlled termination reactions using any of a number of electrophiles, including ethylene oxide, propylene oxide, episulfides and carbon dioxide, before adding the proton source. The termination reactions are very effective at room temperature. However, a slight molar excess of the terminating agent usually is used to assure complete termination of the polymerization reaction. A wide range of polymers, including random and block copolymers, with well-defined molecular weight and narrow molecular weight distribution, can be prepared by anionic polymerization. Thus, by using this easily controllable living graft-from reaction technique, a variety of graft copolymer compositions with well-defined side chain segments have been produced.

In the transition metal coordination graft reaction process, the pendant styrene units in alpha-olefin/diviylbenzene copolymers (I) serve as monomers directly. After mixing the copolymer (I) with an olefin monomer in a suitable diluent, the transition metal coordination catalyst is introduced to initiate graft-onto or/and graft-through polymerization reactions. Olefin monomers that may be used include, for example, aliphatic alpha-olefins, aromatic vinyl compounds, cyclic olefins, and their mixtures having 2 to 15 carbon atoms. Suitable aliphatic alpha-olefin include, for example, ethylene, 1-propene, 1-butene, 1-bexene, 1-octene, 4-methyl-1-pentene, and so on. Suitable aromatic vinyl compounds include, for example, styrene and styrene derivatives, such as p-methylstyrene, p-chlorostyrene or the like. Suitable cyclic olefins include, for example, norbornene and norbornene derivatives, such as 1-methylnorbornene, 5-methylnorbornene, 5,6-dimethylnorbornene or the like. Suitable diluents include the general group of aliphatic and aromatic hydrocarbons, used singly or in a mixture, such as propane, butane, pentane, cyclopentane, hexane, toluene, heptane, isooctane or the like.

The transition metal coordination catalysts capable of olefin polymerization may be used for the graft reaction. Catalysts of this type include the active ionic complex shown in the following formula:

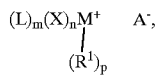

wherein L is a ligand such as cyclopentadienyl, substituted cyclopentadienyl, amido, phosphido, a bulky alpha-diimine group or the like, or a bridged ligand having a covalent bridging group (such as silane, methyl and dimethyl groups) between two ligands; X is selected from hydride, halo, alkyl, aryl, aryloxy, and alkoxy; m and n, independantly, are 0, 1 or 2; $R^1$ is a hydride or hydrocarbon having form 1 to 20 carbon atoms; and p is 1. M is a transition metal of Groups IIIB to VIIB and VIII of the Periodic Table. Particularly suitable catalysts are metallocene complexes of a Group IVB and VB metal such as titanium, zirconium and hafnium. A is a non-coordinating, compatible anion. Particularly suitable anions are those derived from methylaluminoxane (MAO) and borates, such as tetraphenylborate, tetra (pentafluorophenyl)borate and methyltri(pentafluorophenyl) borate.

The ionic catalyst species useful in the invention may be prepared by methods known in the art. For example, they may be prepared by combining (a) a transition metal compound of the Groups IIIB to VIIB and VIII of the Periodic Table and (b) a compound capable of reacting with a transition metal compound to form an ionic complex. In the reaction of compounds (a) and (b), the compound (a) forms a cation formally having a coordination number that is one less than its valence, and the compound (b) becomes a non-coordinating, compatible anion.

The graft polymerization processes of the present invention can be carried out under homogeneous or suspension solution conditions, depending on the copolymer (I) and olefin monomer used.

In the free radical graft reaction process, the pendant styrene units in the alpha-olefin/diviylbenzene copolymer (I) also serve as monomers directly. After mixing the copolymer (I) with the free radical polymerizable alpha-olefin monomer in a suitable diluent, the free radical initiator is introduced to initiate graft-onto or/and graft-through polymerization reactor under conditions effective to form free radicals. As the radical polymerizable monomer to be used in this graft reaction, those well known in the art can be used. Specific examples of suitable monomers include methyl methacrylate, ethyl methacrylate, butyl methacrylate, octyl methacrylate, methacrylic acid, methyl acrylate, ethyl acrylate, butyl acrylate, octyl acylate, 2-hydroxyethyl acrylate, glycidyl acrylate, acrylic acid, maleic anhydride, vinyl acetate, acrylonitrile, acrylamide, vinyl chloride, vinyl fluoride, vinylidenedifluoride, teitrafluoroethylene, styrene, alpha-methyl styrene, trimethoxyvinylsilane, triethoxyvinylsilane and so on. These radical polymerizable monomers can be used either singly or as a combination of two or more monomers.

In a thermal initiation process, the reaction temperature may be in the range of 50 to 250° C., preferably in the range of from 65 to 120° C. The polymerization time typically is in the range of from about 10 minutes to about 30 hours, and preferably from about 1 to 15 hours.

The following examples are illustrative of the invention.

EXAMPLE 1

Synthesis of Poly(ethylene-ter-1-octene-ter-divinylbenzene) by Et(Ind)$_2$ZrCl$_2$/MAO catalyst In a terpolymerization reaction, 1-octene (80 mmol) and divinylbenzene (20 mmol) were mixed with 100 ml of hexane and 3 ml of methylaluminoxane (MAO) (2.5M in toluene) in a sealed Parr 450 mL stainless autoclave equipped with a mechanical stirrer. The sealed reactor was then saturated with 10 psi ethylene gas at 50° C. before adding an ethyldiindenylzirconium dichloride catalyst solution (Et(Ind)$_2$ZrCl$_2$ (2.5 µmol) in toluene) to initiate the polymerization. Additional ethylene was fed continuously into the reactor by maintaining a constant pressure (10 psi) during the entire course of the polymerization. After 30 minutes, the reaction was terminated by adding 100 mL of dilute HCl solution in methanol. The polymer was precipitated in methanol and isolated by filtration. Further purification was carried out by redissolving the polymer in hexane and reprecipitating it in methanol twice. After vacuum drying for 8 h, 3.79 g of ethylene/1-octene/divinylbenzene terpolymer were obtained. The terpolymer was completely soluble in common organic solvents, such as hexane, toluene and tetrahydrofuran (THF). The terpolymer composition (69.4 mol % ethylene, 28.6 mol % 1-octene, and 2.0 mol % DVB) and molecular weight (Mw=92,900 and Mn=43,300) were analyzed by $^1$H NMR and gel permeation chromatography (GPC), respectively. The mole ratio of unsaturation/ divinylbenzene moieties (TUS/DOU) is near unity. The glass transition temperature of the terpolymer (Tg=−57° C.), was measured by differential scanning calorimetry (DSC). The sharp Tg transition with flat baseline indicates homogeneous terpolymer microstructure.

EXAMPLES 2–7

Synthesis of Poly(ethylene-ter-1-octene-ter-divinylbenzene) by Et(Ind)$_2$ZrCl$_2$/MAO catalyst In a series of Examples, high molecular weight of linear ethylene/1-octene/divinylbenzene copolymers were prepared in accordance with the procedures described in Example 1. The monomer feed for each example is indicated in Table 1 (Table 1 also shows the results for Example 1, as well as an un-numbered example for an ethylene-1-octene copolymer). The composition and molecular weight (and molecular weight distribution) of terpolymer were determinated by $^1$H NMR and gel permeation chromatography (GPC), respectively. The glass transition temperature (Tg) was measured by differential scanning calorimetry (DSC). The results obtained are set forth in Table 1. All terpolymerization reactions of ethylene/1-octene/divinylbenzene were very effective when using Et(Ind)$_2$ZrCl$_2$/MAO catalyst. A broad composition range of terpolymers was obtained with high molecular weight, and narrow molecular weight distribution. In general, the terpolymers exhibit a mole ratio of TUS/DOU near unity and a low Tg (<−40° C.) in a wide range of copolymer compositions, even those having relatively high divinylbenzene contents (e.g., 8 mole %).

TABLE 1

A summary of terpolymerization[a] of ethylene, 1-octene and divinylbenzene using rac-Et(Ind)$_2$ZrCl$_2$/MAO catalyst

| Examples | Monomer concn. in the feed mol/l | | | Cat. Activity | copolymer composition[b] mol % | | | | Tg, °C | Mw | PD |
|---|---|---|---|---|---|---|---|---|---|---|---|
| | Ethylene Psi | 1-Octene | Divinyl-benzene | KgP/ mol Zr · h | [E] | [O] | [D] | TUS/DOU | | | |
| | 10 | 0.8 | 0 | 7776 | 61.5 | 38.5 | 0 | — | −60.2 | 79286 | 1.97 |
| 1 | 10 | 0.8 | 0.2 | 3032 | 69.4 | 28.6 | 2.0 | 0.99 | −57.4 | 92861 | 2.15 |
| 2 | 10 | 0.8 | 0.4 | 2016 | 66.8 | 29.2 | 4.0 | 0.95 | −53.5 | 92441 | 2.28 |
| 3 | 1 | 0.8 | 0.8 | 1840 | 74.8 | 20.8 | 4.4 | 0.98 | −51.2 | 36871 | 2.59 |
| 4 | 5 | 0.8 | 0.2 | 1224 | 64.4 | 33.4 | 2.2 | 0.92 | −60.3 | 51576 | 2.16 |
| 5 | 5 | 0.8 | 0.8 | 1128 | 63.8 | 29.5 | 6.7 | 0.92 | −56.5 | 58864 | 2.51 |
| 6 | 5 | 0.8 | 1.4 | 1000 | 69.8 | 22.2 | 8.0 | 0.96 | −50.3 | 71505 | 2.27 |
| 7 | 5 | 0.4 | 0.8 | 1309 | 71.8 | 20.9 | 7.3 | 0.92 | −55.0 | 68780 | 2.07 |

[a]Polymerization conditions: [cat] = 2.5 × 10$^{-6}$ mol, [MAO]/[Zr] = 3000; solvent; 100 ml hexane; polymerization temperature: 50° C.; polymerization time: 30 min;
[b][E]: Ethylene, [O]: 1-Octene; [D]: Divinylbenzene; TUS/DOU: mole ratio of unsaturation/divinylbenzene.

EXAMPLES 8–11

Synthesis of Poly(ethylene-ter-1-octene-terdivinylbenzene) by [C$_5$Me$_4$(SiMe$_2$NtBu)]TiCl$_2$/MAO catalyst In a series of Examples, ethylene, 1-octene and divinylbenzene were terpolymerized in the prescence of a catalyst system ing of dicyclopentadienyldimethylsilyl-t-butyl aminotitanium dichloride/methylaluminoxane ([C$_5$Me$_4$(SiMe$_2$N$^t$Bu)]TiCl$_2$/MAO). The reaction procedures described in Example 1 were followed by adding 1-octene, divinylbenzene, hexane and methylaluminoxane (MAO) into a Parr 450 ml stainless autoclave reactor. Ethylene gas was then connected to the reactor. After saturating with ethylene gas at 50° C., the polymerization reaction was initiated by charging [C$_5$Me$_4$(SiMe$_2$N$^t$Bu)]TiCl$_2$ (2.5 mmol) in toluene solution into the monomer mixture. Table 2 summarizes the reaction conditions and results. Some terpolymers produced were not completely soluble. The soluble portions were analyzed by $^1$H NMR and DSC. In general, the [C$_5$Me$_4$(SiMe$_2$N$^t$Bu)]TiCl$_2$/MAO catalyst showed good divinylbenzene incorporation in the terpolymer, even up to 26 mole % divinylbenzene content. However, the mole ratio of unsaturation/divinylbenzene moieties (TUS/DOU) in each copolymer was well-below unity, indicating some secondary reaction having occurred at the pendant styrene groups in the copolymer.

EXAMPLES 12–15

Synthesis of Poly(ethylene-ter-1-octene-terdivinylbenzene) by Cp$_2$ZrCl$_2$/MAO catalyst Another series of Examples was conducted to evaluate the terpolymerization of ethylene, 1-octene and divinylbenzene in the presence of dicyclopentadienylzirconium dichloride/methylaluminoxane catalyst (Cp$_2$ZrCl$_2$/MAO) by the reaction procedures described in Example 1. The terpolymers produced were not completely soluble. The soluble portions were analyzed by $^1$H NMR and DSC. Table 3 summarizes the reaction conditions and results. In general, all reactions conducted in the presence of Cp$_2$ZrCl$_2$/MAO catalyst showed poor divinylbenzene incorporation, with TUS/DOU ratios well-below unity. DSC results showed some detectable melting peaks in each terpolymer, indicating an inhomgneous composition distribution.

TABLE 2

A summary of terpolymerization[a] of ethylene, 1-octene and divinylbenzene using [(C$_5$Me$_4$)SiMe$_2$N(tBu)]TiCl$_2$/MAO catalyst

| Examples | monomer concn. in the feed mol/l | | | Cat. Activity | copolymer composition[c] mol % | | | | Tg, °C |
|---|---|---|---|---|---|---|---|---|---|
| | Ethylene Psi | 1-Octene | Divinyl-benzene | KgP/ mol Zr · h | [E] | [O] | [D] | TUS/DOU | |
| 8 | 10 | 0.8 | 0 | 2880 | 17.8 | 82.2 | 0 | — | −61.3 |
| 9 | 10 | 0.8 | 0.2 | 1504 | 14.6 | 78.2 | 7.2 | 0.58 | −58.5 |
| 10 | 10 | 0.8 | 0.4 | 984 | 25.6 | 58.3 | 16.1 | 0.68 | −55.9 |
| 11 | 10 | 0.8 | 0.8 | 536 | 31.0 | 41.2 | 26.8 | 0.52 | −46.2[b] |

[a]Polymerization conditions: [cat] = 2.5 × 10$^{-6}$ mol, [MAO]/[Ti] = 3000; solvent; 100 ml hexane; polymerization temperature: 50° C.; polymerization time: 30 min;
[b]Crystallinity exixts;
[c][E]: Ethylene, [O]: 1-Octene; [D]: Divinylbenzene; TUS/DOU: mole ratio of unsaturation/divinylbenzene.

TABLE 3

A summary of terpolymerization[a] of ethylene, 1-octene and divinylbenzene using Cp$_2$ZrCl$_2$/MAO catalyst

| Examples | Monomer concn. in the feed mol/l | | | Cat. Activity | copolymer composition[c] mol % | | | | |
|---|---|---|---|---|---|---|---|---|---|
| | Ethylene Psi | 1-Octene | Divinyl-benzene | KgP/mol Zr · h | [E] | [O] | [D] | TUS/DOU | Tg, °C. |
| 12 | 10 | 0.8 | 0 | 3968 | 77.5 | 22.5 | 0 | — | −52.4[b] |
| 13 | 10 | 0.8 | 0.2 | 2296 | 78.1 | 20.8 | 1.1 | 0.52 | −52.2[b] |
| 14 | 10 | 0.8 | 0.6 | 1328 | 83.6 | 14.9 | 1.5 | 0.51 | −43.0[b] |
| 15 | 10 | 0.8 | 1.2 | 760 | 81.3 | 15.1 | 3.6 | 0.24 | −28.1[b] |

[a]Polymerization conditions: [cat] = 2.5 × 10$^{-6}$ mol, [MAO]/[Zr] = 3000; solvent; 100 ml hexane; polymerization temperature: 50° C.; polymerization time: 30 min;
[b]Crystallinity exists;
[c][E]: Ethylene, [O]: 1-Octene; [D]: Divinylbenzene; TUS/DOU: mole ratio of unsaturation/divinylbenzene.

EXAMPLE 16

Synthesis of Poly(ethylene-ter-propylene-ter-divinylbenzene) by Et(Ind)$_2$ZrCl$_2$/MAO catalyst In a terpolymerization reaction, divinylbenzene (10 mmol) was added into a Parr 450 ml stainless autoclave reactor with hexane (100 ml) and methylaluminoxane (3 ml, 2.5M in toluene). Pre-mixed ethylene (40 psi) and propylene (60 psi) were then connected to the reactor. After saturating with both ethylene and propylene gases at 50° C., the total pressure in the reactor was controlled at 30 psi. The polymerization reaction was initiated by charging a Et(Ind)$_2$ZiCl$_2$ (2.5 mmol) in toluene solution into the monomer mixture. A constant, mixed ethylene/propylene pressure was maintained throughout the polymerization process. To assure a constant comonomer ratio, the polymerization was terminated within 15 minutes by adding dilute HCl/methanol solution. The polymer was isolated by filtration and was washed completely with methanol and dried under vacuum for 8 h. About 1.74 g of terpolymer was obtained, which was completely soluble in common organic solvents, such as hexane, toluene and tetrahydrofuran (THF). The terpolymer was analyzed by $^1$H NMR, GPC and DSC. The $^1$H NMR results showed that the terpolymer contained 56.4 mole % of ethylene, 42.5 mole % of propylene and 1.1 mole % of divinylbenzene, and the mole ratio of TUS/DOU was near unity. The GPC curve showed a high molecular weight terpolymer having a narrow molecular weight distribution. A sharp glass transition temperature (Tg) at −50° C., without any detectable melting peak, in the DSC curve indicated that the terpolymer had a narrow composition distribution.

EXAMPLES 17–21

Synthesis of Poly(ethylene-ter-propylene-terdivinylbenzene) by Et(Ind)$_2$ZrCl$_2$/MAO catalyst In a series of Examples, high molecular weight ethylene/propylene/divinylbenzene terpolymers were prepared by the reaction procedures described in Example 16, except for the monomer feeds, which are shown in Table 4. In general, the incorporation of divinylbenzene in the ethylene-propylene-divinylbenzene terpolymer was effective when using Et(Ind)$_2$ZrCl$_2$ catalyst. Up to 20 mole % of divinylbenzene was observed in the terpolymers. All terpolymers produced were soluble in common organic solvents and were analyzed by $^1$H NMR, GPC and DSC. Each terpolymer exhibited a mole ratio of TUS/DOU near unity. The DSC results showed no detectable melting point (Tm) in the terpolymers. The sharp glass transition temperature (Tg) with flat baseline in each DSC curve indicated homogeneous terpolymer microstructures.

TABLE 4

A summary of terpolymerization of ethylene, propylene and divinylbenzene by rac-Et(Ind)$_2$ZrCl$_2$/MAO catalyst[a]

| Ex. | E/p Mixing Ratio psi/psi | Divinyl benzene mol/l | Catalyst Activity kg P/mol Zr · h | Copolymer composition,[b] Mol % | | | TUS/DOU | Tg °C. | Mw | Mn | PD |
|---|---|---|---|---|---|---|---|---|---|---|---|
| | | | | [E] | [P] | [D] | | | | | |
| 16 | 40/60 | 0.1 | 2780 | 56.4 | 42.5 | 1.1 | 94.0 | −50.6 | 85623 | 39277 | 2.18 |
| 17 | 40/60 | 0.3 | 2000 | 59.3 | 39.0 | 1.7 | 91.2 | −47.3 | 96554 | 47564 | 2.03 |
| 18 | 40/60 | 0.6 | 1650 | 62.4 | 32.9 | 4.7 | 96.0 | −31.3 | 98158 | 41769 | 2.35 |
| 19 | 40/60 | 1.2 | 1230 | 56.0 | 22.9 | 21.1 | 96.0 | −21.6 | 137480 | 63355 | 2.17 |
| 20 | 60/40 | 0.3 | 1810 | 67.8 | 30.6 | 1.6 | 96.0 | −36.4 | 102503 | 49759 | 2.06 |
| 21 | 60/40 | 0.6 | 1700 | 65.3 | 30.3 | 4.4 | 90.2 | −29.0 | 127861 | 56827 | 2.25 |

[a]Polymerization conditions: 100 ml hexane, [Zr] = 2.5 × 10$^{-6}$ mol, [MAO]/[Zr] = 3000; 50° C., 15 minutes, 30 psi;
[b][E]: Ethylene, [P]: Propylene; [D]: Divinylbenzene; TUS/DOU: mole ratio of unsaturation/divinylbenzene.

EXAMPLES 22–24

Synthesis of Poly(ethylene-ter-propylene-ter-divinylbenzene) by [C$_5$Me$_4$(SiMe$_2$N$^t$Bu)]TiCl$_2$/MAO catalyst A series of Examples was conducted to evaluate the terpolymerization of ethylene, propylene and divinylbenzene using [C$_5$Me$_4$(SiMe$_2$N$^t$Bu)]TiCl2/MAO catalyst. The reaction procedures described in Example 16 were followed by adding divinylbenzene, hexane and methylaluminoxane (>AO) into a Parr 450 ml stainless autoclave reactor. Premixed ethylene/propylene gases were then connected to the reactor. After saturating with both ethylene and propylene gases at 50° C., the total pressure in the reactor was controlled at 30 psi. The polymerization reaction was initiated by charging a [C$_5$Me$_4$(SiMe$_2$N$^t$Bu)]TiCl$_2$ (2.5 mmol) in toluene solution into the monomer mixture. Table 5 summarizes the reaction conditions and results. In general, the incorporation of divinylbenzene in the ethylene-propylene-divinylbenzene terpolymer was very effective when using [C$_5$Me$_4$(SiMe$_2$N$^t$Bu)]TiCl$_2$/MAO catalyst. However, most of the terpolymers produced were not completely soluble. Some insoluble gel particles, which are indicative of a degree of crosslinking, were observed. The terpolymers were analyzed by $^1$H NMR, GPC and DSC. The DSC curve for each terpolymer indicated no clear thermal transition with an uneven baseline.

catalyst The mole ratio of TUS/DOU for each copolymer was near unity. The copolymers were analyzed by $^1$H NMR, GPC and DSC. The relatively sharp and uniform GPC and DSC curves for all copolymers demonstrate narrow molecular weight distributions and substantially homogeneous composition distributions (i.e., compositional uniformity over the entire range of compositions).

TABLE 6

A summary of ethylene copolymerization with divinylbenzene by rac-Et(Ind)$_2$ZrCl$_2$/MAO catalyst[a]

| Examples | Ethylene psi | Divinyl- benzene mol/l | Catalyst Activity kg P/mol Zr · h | Divinylbenzene In copolymer mol % | TUS/ DOU[b] |
|---|---|---|---|---|---|
| 25 | 30 | 0.1 | 3304 | 0.72 | 0.90 |
| 26 | 30 | 0.2 | 2864 | 1.04 | 0.90 |
| 27 | 30 | 0.4 | 2456 | 1.97 | 0.92 |
| 28 | 30 | 1.2 | 2024 | 3.83 | 0.90 |
| 29 | 10 | 0.2 | 1000 | 2.03 | 0.93 |
| 30 | 10 | 0.4 | 984 | 3.26 | 0.96 |
| 31 | 10 | 0.8 | 528 | 5.40 | 0.92 |
| 32 | 5 | 0.4 | 640 | 3.82 | 0.91 |
| 33 | 5 | 0.8 | 528 | 6.74 | 0.93 |

[a]Polymerization conditions: 100 ml hexane, [Zr] = 2.5 × 10$^{-6}$ mol, [MAO]/[Zr] = 3000; 50° C., 15 minutes, 30 psi;
[b]TUS/DOU: mole ratio of unsaturation/divinylbenzene.

TABLE 5

A summary of terpolymerization of ethylene, propylene and divinylbenzene by [(C$_5$Me$_4$)SiMe$_2$N(t-Bu)]TiCl$_2$/MAO catalyst[a]

| Ex. | mixing ratio psi/psi | E/P Divinyl benzene mol/l | Catalyst Activity kg P/mol Ti · h | Copolymer composition,[b] Mol % | | | | Tg ° C. |
|---|---|---|---|---|---|---|---|---|
| | | | | [E] | [P] | [D] | TUS/DOU | |
| 22 | 50/50 | 0.1 | 453 | 48.6 | 44.8 | 6.6 | 0.42 | n.d.[b] |
| 23 | 50/50 | 0.3 | 400 | 48.8 | 37.1 | 14.1 | 0.44 | n.d. |
| 24 | 50/50 | 0.6 | 421 | 41.3 | 28.8 | 29.9 | 0.52 | n.d. |

[a]Polymerization conditions: 100 ml hexane, [Ti] = 2.5 × 10$^{-6}$ mol, [MAO]/[Ti] = 3000; 50° C., 15 minutes, 30 psi;
[b]n.d. - can not be determined;
[c][E]: Ethylene, [P]: Propylene; [D]: Divinylbenzene; TUS/DOU: mole ratio of unsaturation/divinylbenzene.

EXAMPLES 25–33

Synthesis of Poly(ethyleneco-divinylbenzene) by Et(Ind)$_2$ZrCl$_2$/MAO catalyst In a series of Examples, high molecular weight of ethylene/divinylbenzene copolymers were prepared by batch slurry polymerization in a Parr 450 ml stainless autoclave equipped with a mechanical stirrer. After mixing the desired quantities of divinylbenzene, MAO and hexane in a reactor, the reactor was sealed and then saturated with ethylene gas at 50° C. under the ethylene pressure indicated in Table 6. An Et(Ind)$_2$ZrCl$_2$ (2.5 mmol) catalyst in toluene was added to initiate the polymerization. Additional ethylene was fed continuously into the reactor for maintaining a constant pressure during the entire course of the polymerization. The copolymerization reactions were terminated by adding 100 ml of dilute HCl solution in methanol. The polymers were isolated by filtration and were washed completely with methanol and dried under vacuum for 8 hrs. The results obtained are set forth in Table 6.

In general, the incorporation of divinylbenzene in polyethylene was effective when using Et(Ind)$_2$ZrCl$_2$/MAO

EXAMPLE 34–38

Synthesis of Poly(propylene-co-divinylbenzene) by MgCl$_2$/TiCl$_4$/ED/AlEt$_3$ Catalyst A series of comparative polymerization reactions between propylene and divinylbenzene were carried out using magnesium dichloride/titanium tetrachloride/external donor/triethyl aluminum (MgCl$_2$/TiCl$_4$/ED/AlEt$_3$) as a catalyst system. In a typical Example (e.g., Example 34), 100 ml of hexane, 2.0 g of AlEt$_3$, and 40 mmol divinylbenzene were placed into a Parr 450 ml stainless autoclave equipped with a mechanical stirrer in an argon filled dry-box. The reactor was sealed and then moved out from the dry box and purged with propylene gas, and the reaction mass was saturated with 30 psi propylene gas at 50° C. About 55 mg (20.8 umol Ti) of MgCl$_2$/ED/TiCl$_4$ catalyst slurry in 5 ml of hexane was added under propylene pressure to initiate the polymerization. Additional propylene was fed continuously into the reactor to maintain a constant pressure of 30 psi during the entire course of the polymerization. After 60 min, the reaction was terminated by adding 100 ml of dilute HCl solution in methanol. The polymer was isolated by filtration and was washed completely with methanol and dried under vacuum for 8 hrs. About 6.41 g of propylene-co-divinylbenzene was obtained. Reaction conditions similar to those described for Example 34 were carried out for Examples 35–38. Table 7 summarizes all experimental conditions and results.

In general, the $MgCl_2/ED/TiCl_4/AlEt_3$ catalyst system maintained good reactivity in the presence of divinylbenzene. As expected, divinylbenzene incorporation was very poor, and the mole ratio of vinyl/phenyl moieties (TSU/DOU) for each copolymer was near unity.

TABLE 7

A summary of propylene copolymerization with divinylbenzene by $MgCl_2/TiCl_4$—$AlEt_3/ED$ catalyst[a]

| Ex. | Propylene Psi | Divinyl-benzene mol/l | Catalyst Activity kg P/mol Ti · h | Divinylbenzne in copolymer mol % | TUS/DOU[b] |
|---|---|---|---|---|---|
| 34 | 30 | 0.4 | 308 | 0.59 | 0.85 |
| 35 | 30 | 0.8 | 217 | 0.94 | 0.94 |
| 36 | 30 | 1.2 | 68 | — | — |
| 37 | 50 | 0.8 | 318 | 0.62 | 0.90 |
| 38 | 70 | 0.8 | 392 | 0.51 | 0.97 |

[a]Polymerization conditions: 100 ml hexane, [Ti] = 20.8 μmol, Al/Ti = 90, ED/Ti = 6, 50° C., 60 minutes.
[b]TUS/DOU: mole ratio of unsaturation/divinylbenzene.

EXAMPLE 39

Lithiation and Silylation reactions of Poly(ethylene-ter-1-octene-ter-divinylbenzene)

In an argon filled dry box, 0.86 g of poly(ethylene-ter-1-octene-ter-divinylbenzene) containing 4.7 mole % of divinylbenzene units was dissolved in 100 ml of anhydrous cyclohexane in a 250 ml air-free flask equipped with a magnetic stirrer bar. Next, 0.75 mmol of s-butyl lithium (s-BuLi) solution and 0.75 mmol of tetramethylethylenediamine (TMEDA) were added into the flask, and the resulting solution was stirred at ambient temperature for 3 hours before adding 5 ml of trimethylsilane chloride ($Me_3SiCl$). After reacting for 1 hour at room temperature, the silylated polymer was isolated by precipitation in methanol. Repeated washing with methanol was performed before drying the resulting polymer under vacuum. $^1H$ NMR spectrum shows no peak corresponding to a vinyl group and a strong peak at 0.05 ppm, corresponding to the methyl proton next to Si. Both metallation and silylation efficiencies were almost 100%.

EXAMPLE 40

Maleation Reaction of Poly(ethylene-ter-1-octene-ter-divinylbenzene)

In a 250 ml flask equipped with a stirrer and a condenser, 0.8 g of poly(ethylene-ter-1-octene-ter-divinylbenzene) containing 4.7 mole % of divinylbenzene was dissolved in 140 ml of xylene, along with 5 g of maleic anhydride and 0.1 g of free radical inhibitor. Under a nitrogen atmosphere, the solution was heated to 140° C. for 5 hours. A maleated polymer was isolated by precipitation in isopropanol. Repeated washing with isopropanol and acetone were performed before drying the resulting polymer under vacuum. IR spectrum analysis indicated a strong anhydride (C=O) absorption band with an intensity indicating 11.5 wt % maleic anhydride in the polymer.

EXAMPLES 41–44

Anionic Graft Reactions of Poly(ethylene-ter-1-octene-ter-divinylbenzene)

In a series of Examples, the indicated quantity (shown in Table 8) of poly(ethylene-ter-1-octene-ter-divinylbenzene) containing 4.7 mole % of divinylbenzene was dissolved in 100 ml of anhydrous cyclohexane in a 250 ml flask equipped with a stirrer. A metallation reaction was performed by adding the indicated quantities (shown in Table 8) of s-BuLi and tetramethylethylenediamine (TMEDA) to the solution. In each case, the resulting mixture was stirred at ambient temperature for 3 hours before adding styrene monomer. An anionic graft-from reaction was then carried out at ambient temperature for 1 hour before adding 10 ml of isopropanol to terminate the reaction. The precipitated polymers were filtered and then subjected to fractionation. The graft copolymer structures and compositions were determined by IR, $^1H$ NMR, GPC and DSC studies. Table 8 summarizes the reaction conditions and the experimental results. Overall, the graft-from reactions were very effective, with more than 80% monomer conversion within one hour. The graft content increased proportionally with increasing monomer concentration and reaction time. Since the graft-from reaction involves a living anionic polymerization, it is reasonable to assume that each benzylic lithium produces one polymer side chain and each side chain has a similar molecular weight. The graft density, defined as the number of grafted side chains per 1000 carbons in the polymer backbone, is the same as the density of benzylic anions. The side chain length is basically proportional to the reaction time and monomer concentration.

TABLE 8

A summary of graft polymerization of styrene from "reactive" poly(ethylene-ter-1-octene-ter-divinylbenzene)terpolymer

| | Reaction conditions[a] | | | | | Graft copolymers | | |
|---|---|---|---|---|---|---|---|---|
| Ex. | Terpolymer[b] g | Sec-BuLi mmol | TMEDA mmol | Styrene ml | Yield g | Graft composition mol % | # of graft/ 1000 C. of backbone | Graft length $10^3$g/mol |
| 41 | 0.85 | 0.60 | 0.60 | 1.0 | 1.83 | 39.4 | 19 | 1.69 |
| 42 | 0.81 | 0.60 | 0.60 | 2.2 | 2.27 | 47.9 | 19 | 2.40 |

TABLE 8-continued

A summary of graft polymerization of styrene from "reactive" poly(ethylene-ter-1-octene-ter-divinylbenzene)terpolymer

| Ex. | Reaction conditions[a] | | | | | Graft copolymers | | |
|---|---|---|---|---|---|---|---|---|
| | Terpoly-mer[b] g | Sec-BuLi mmol | TMEDA mmol | Styrene ml | Yield g | Graft composition mol % | Graft density # of graft/ 1000 C. of backbone | Graft length $10^3$ g/mol |
| 43 | 0.81 | 0.60 | 0.60 | 3.5 | 3.21 | 57.7 | 19 | 4.64 |
| 44 | 0.85 | 0.75 | 0.75 | 3.5 | 3.23 | 59.7 | 24 | 3.26 |

[a]Solvent: 100 ml of anhydrous cyclohexane; Metallation reaction time: 3 h; Graft from polymerization time: 1 h; Reaction temperature: 25° C.
[b]The starting material was poly(ethylene-ter-1-octene-ter-divinylbenzene) terpolymer with styrenic double bond content of 4.7 mole %.

EXAMPLES 45–47

Graft Reactions of Poly(ethylene-ter-propylene-ter-divinylbenzene) with Styrene, p-Methylstyrene), and MMA by Living Anionic Polymerization In a 250 ml flask equipped with a stirrer, 3 g of poly (ethylene-ter-propylene-ter-divinylbenzene) containing 50.1 mol % ethylene, 47.0 mol % propylene, and 2.9 mole % of divinylbenzene was dissolved in 100 ml of anhydrous cyclohexane. The metallation reaction was taken place by adding 2 ml of 2.5M n-BuLi/hexane to the solution. The mixture was stirred at ambient temperature for 3 hours before adding desirable quantity of monomer (shown in Table 9). The graft reaction was then carried out at ambient temperature for the indicated period before adding 10 ml of isopropanol to terminate the anionic graft reaction. The precipitated polymer was filtered and then subjected to Soxlet fractionation by hexane. In each case, it was found that less than 5 weight % of the copolymer was ungrafted. The graft copolymer structures and compositions were determined by $^1$H NMR, GPC and DSC studies. Table 9 summarizes the reaction conditions and the experimental results. Overall, the graft-from reactions with styrene, p-methylstyrene (p-MS) and methylmethacrylate (MMA) were very effective with high incorporation of side chain polymers.

TABLE 9

A summary of anionic graft polymerization of styrene, p-methylstyrene and methylmethacrylate from Poly(ethylene-ter-propylene-ter-divinylbenzene)terpolymer

| Examples | Graft polym. Cond. | | | | Graft composition, wt % | |
|---|---|---|---|---|---|---|
| | Monomer/g | Time hr | Yield g | Hexane soluble Portion wt % | EP-DVB | PS or P(PMS) or PMMA |
| 45 | Styrene/4.5 | 4.0 | 7.1 | 4.2 | 39.7 | PS/60.3 |
| 46 | p-MS/4.1 | 4.0 | 6.7 | 3.6 | 42.8 | P(PMS)/57.2 |
| 47 | MMA/5.4 | 16.0 | 8.1 | 4.1 | 34.3 | PMMA/65.7 |

EXAMPLE 48

Lithiation and Silylation reactions of Poly(ethylene-co-divinylbenzene)

In an argon filled dry box, 8 g of poly(ethylene-co-divinylbenzene) powder containing 1.73 mol % of divinylbenzene units was suspended in 100 ml of anhydrous cyclohexane in a 250 ml air-free flask with a magnetic stirrer bar. About 6 ml of 1.3M s-BuLi and 2.5 ml TMEDA were added to the reactor. After allowing the lithiation reaction to take place at 60° C. for 4 hours, the resulting yellow polymer powder was filtered and washed repeatedly with hexane. About 1 g of the lithiated polymer was then suspended in 30 ml of cyclohexane, and 3 ml of $Me_3SiCl$ was added into the slurry. The solution was then stirred at ambient temperature for 2 hours. The silylated PE was collected by filtering and washing repeatedly with THF, methanol, water and then methanol before drying under vacuum. $^1$H NMR spectrum shows almost no peak corresponding to vinyl group and a strong peak at 0.05 ppm corresponding to the methyl proton next to Si. Both metallation and silylation efficiencies must be over 90%.

EXAMPLE 49

Lithiation and Silylation Reactions of Poly(propylene-divinylbenzene)

In an argon filled dry box, 8 g of poly(propylene-co-divinylbenzene) powder containing 0.94 mol % of divinylbenzene units was suspended in 100 ml of anhydrous cyclohexane in a 250 ml air-free flask with a magnetic stirrer bar. About 6 ml of 1.3M s-BuLi and 2.5 ml TMEA were added to the reactor. After allowing the lithiation reaction to take place at 70° C. for 4 hours, the resulting yellow polymer powder was filtered and washed repeatedly with hexane. About 1 g of the lithiated polymer was then suspended in 30 ml of cyclohexane, and 3 ml of $Me_3SiCl$ was added into the slurry. The solution was then stirred at ambient temperature for 2 hours. The silylated PP was collected by filtering and washing repeatedly with THF, methanol, water and then methanol before drying under vacuum. $^1$H NMR spectrum shows almost no peak corresponding to vinyl group and a strong peak at 0.05 ppm corresponding to the methyl proton next to Si. Both metallation and silylation efficiencies must be over 90%.

EXAMPLES 50–56

Graft Reactions of Poly(ethylene-co-divinylbenzene) with Styrene, p-Methylstyrene, and MMA by Living Anionic Polymerization In a 100 ml flask equipped with a stirrer, a desirable quantity (shown in Table 10) of the lithiated poly(ethylene-co-divinylbenzene) prepared in Example 48 was suspended in 30 ml of anhydrous cyclohexane. A certain quantity of monomers (shown in Table 10) was then added to the reactor, and the mixture was stirred at ambient temperature for the indicated period before adding 10 ml of isopropanol to terminate the anionic graft reaction. The precipitated polymer was filtered and then subjected to Soxlet fractionation (using THF for styrene and p-methylstyrene cases and acetone for MMA cases). Almost no ungrafted polymer was observed for each example. The structures and compositions of graft copolymers were determined by IR, $^1$H NMR, GPC and DSC studies. Table 10 summarizes the reaction conditions and the experimental results. Overall, the graft-from reactions were very effective, near quantitative styrene and p-methylstyrene conversions within 4 hours. The graft content increased proportionally with increasing monomer concentration and reaction time. Since the graft-from reaction involves a living anionic polymerization, it is reasonable to assume that each benzylic lithium produces one polymer side chain and each side chain has similar molecular weight.

TABLE 10

A summary of anionic graft reaction from poly(ethylene-co-divinylbenzene)copolymer

| Examples | Graft from polymerization conditions[a] | | | | Comonomer in graft Mole % |
|---|---|---|---|---|---|
| | PELi+[b] g | Monomer g | Time Hr | Yield g | |
| 50 | 1.0 | Styrene/0.9 | 2.0 | 1.7 | 16.1 |
| 51 | 1.0 | Styrene/2.7 | 4.0 | 3.5 | 41.3 |
| 52 | 1.0 | Styrene/4.5 | 4.0 | 5.4 | 55.1 |
| 53 | 0.7 | p-MS/0.9 | 4.0 | 1.5 | 20.4 |
| 54 | 0.7 | p-MS/1.8 | 4.0 | 2.3 | 33.9 |
| 55 | 0.7 | MMA/4.0 | 2.0 | 1.2 | 17.0 |
| 56 | 0.7 | MMA/4.0 | 12.0 | 3.1 | 50.0 |

[a]Polymerization conditions: 30 ml cyclohexane as solvent, ambient temperature
[b]PELi+ was prepared in Example 48

EXAMPLES 57–61

Graft Reactions of Poly(propylene-co-divinylbenzene) with Styrene, and MMA by Living Anionic Polymerization In a 100 ml flask equipped with a stirrer, a desirable quantity (shown in Table 11) of the lithiated poly(propylene-co-divinylbenzene) prepared in Example 49 was suspended in 30 ml of cyclohexane. A certain quantity of styrene or MMA monomers (shown in Table 11) was then added to the reactor, and the mixture was stirred at ambient temperature for few hours before adding 10 ml of isopropanol to terminate the anionic graft reaction. The precipitated polymer was filtered and then subjected to Soxlet fractionation (using THF for styrene cases and acetone for MMA cases). No ungrafted polymer was observed in any example. The graft copolymer structure and composition were determined by IR, $^1$H NMR, GPC and DSC studies. Table 11 summarizes the reaction conditions and the experimental results. Overall, the graft-from reactions were very effective, near quantitative styrene conversion within 5 hours. The graft content increased proportionally with increasing monomer concentration and reaction time. Since the graft-from reaction involves a living anionic polymerization, it is reasonable to assume that each benzylic lithium produces one polymer side chain and each side chain has similar molecular weight.

TABLE 11

A summary of anionic graft reaction from poly(propylene-co-divinylbenzene)copolymer

| Examples | Graft from polymerization conditions[a] | | | | Comonomer in graft mole % |
|---|---|---|---|---|---|
| | PELi+[b] g | Monomer g | Time Hr | Yield g | |
| 57 | 1.0 | Styrene/0.9 | 1.0 | 1.3 | 10.8 |
| 58 | 1.0 | Styrene/1.8 | 3.0 | 2.5 | 26.0 |
| 59 | 1.0 | Styrene/4.5 | 1.0 | 1.9 | 26.4 |
| 60 | 1.0 | Styrene/4.5 | 5.0 | 5.4 | 63.6 |
| 61 | 1.0 | MMA/4.7 | 12.0 | 3.8 | 53.8 |

[a]Polymerization conditions: 30 ml cyclohexane as solvent, ambient temperature
[b]PELi+ was prepared in Example 49.

EXAMPLES 62–69

Graft Copolymers of Poly(ethylene-ter-propylene-ter-divinylbenzene) with Syndiotactic Polystyrene (s-PS) Prepared by Transition Metal Coordination Polymerization Under $N_2$ atmosphere, a desirable quantity (shown in Table 12) of poly(ethylene-ter-ter-divinylbenzene) (EP-DVB) was dissolved in 100 ml toluene in a 250 ml flask, with a stirrer bar. Two starting EP-DVB polymers were used, including sample EP-DVB-A (52.2 mol % ethylene, 46.5 mol % propylene, and 1.7 mole % of divinylbenzene; Tg=−56.5° C.; Mw=85,600 and Mn=39,300 g/mol) and sample EP-DVB-B (57.5 mol % ethylene, 39.4 mol % propylene, and 3.1 mole % of divinylbenzene; Tg=−50.7° C.; Mw=98,200 and Mn=41,800 g/mol). Styrene monomer and MAO were then added into the polymer solution. After stirring the homogeneous solution mixture at 50° C., the graft-onto polymerization reaction was initiated by charging Cp*Ti(OMe)$_3$ ([MAO]/Ti=1500) catalyst. After 1 hour, 10 ml of isopropanol was added to terminate the graft-onto reaction. The precipitated polymer was filtered and then subjected to a consecutive Soxlet fractionation using hexane and o-dichlorobenzene solvents. Table 12 summarizes the experimental conditions and results. The polymer structure and composition were determined by $^1$H and $^{13}$C NMR, high temperature GPC and DSC studies. In most cases, the conversion of styrene was very high, and only about 10 weight % of hexane-soluble fraction that was the ungrafted EP-DVB terpolymer. Based on the combination of all measurements, the o-dichlorobenzene soluble fraction was graft copolymer (EP-DVB-g-s-PS), containing EP backbone and s-PS side chains. GPC curve of each graft copolymer showed a single peak with a narrow molecular distribution, and the molecular weight of graft copolymer was much higher than that of s-PS homopolymer prepared under the same reaction condition (without EP-DVB). In the Examples 62–66, using a first starting EP-DVB texpolymer with 1.7 mol % DVB units, all EP-DVB-g-s-PS graft copolymers were completely soluble in o-dichlorobenzene at elevated temperature. In the Examples 67–69, using a second starting EP-DVB terpolymer with 3.1 mol % DVB units, from 2.4 weight % (Example 67) to 4.8 weight % (Example 69) of graft copolymer was insoluble in o-dichlorobenzene.

distilled MMA. The anionic graft-from reaction was taken place at room temperature for 4 hours before terminating by adding 30 ml of methanol. The precipitated polymer was then filtered and then subjected to acetone extraction to remove any ungrafted PMMA homopolymer. The amount of acetone soluble fraction was negligible. The insoluble fraction was dried in vacuum oven to result in 1.6 g of graft copolymer, containing EP-DVB backbone (18.4 wt %) and both s-PS (46.1 wt %) and PMMA (35.5 wt %) side chains.

TABLE 12

Synthesis of Poly(ethylene-ter-propylene-ter-divinylbenzene)-g-s-PS graft copolymers by Cp*Ti(OMe)₃/MAO catalyst

| | Graft polym. Cond. | | | | Solvent fractionation[b] | | | Graft composition, | | Thermal properties | | |
|---|---|---|---|---|---|---|---|---|---|---|---|---|
| | | | EP- | | ST | wt % | | | wt % | | | |
| Ex. | [Cat] µmol | Styrene g | DVB[a] g | Yield g | conv. % | Hexane soluble | o-DCB soluble | Insoluble | EP-DVB | s-PS | Tg₁ °C. | Tg₂ °C. | Tm °C. |
| 62 | 5.0 | 2.7 | A/0.28 | 2.77 | 91.0 | 7.1 | 93.0 | 0 | 3.1 | 96.9 | n.d[c] | 99.2 | 271.4 |
| 63 | 5.0 | 2.7 | A/0.71 | 3.23 | 92.3 | 12.7 | 87.3 | 0 | 9.9 | 90.1 | n.d. | 91.4 | 270.0 |
| 64 | 5.0 | 2.7 | A/1.20 | 3.80 | 95.6 | 15.0 | 85.0 | 0 | 19.3 | 80.7 | −52.1 | 92.3 | 267.1 |
| 65 | 10.0 | 2.7 | A/0.52 | 3.12 | 95.0 | 11.0 | 89.0 | 0 | 6.2 | 93.8 | n.d. | 97.3 | 270.7 |
| 66 | 5.0 | 5.4 | A/0.58 | 4.85 | 78.2 | 9.0 | 91.0 | 0 | 3.1 | 96.9 | n.d. | 98.9 | 272.9 |
| 67 | 5.0 | 2.7 | B/0.32 | 2.74 | 88.6 | 5.1 | 92.5 | 2.4 | 6.8 | 93.2 | −50.4 | 98.3 | 268.4 |
| 68 | 5.0 | 2.7 | B/0.71 | 3.04 | 85.3 | 10.0 | 86.9 | 3.1 | 14.5 | 85.5 | −48.1 | 97.6 | 261.5 |
| 69 | 5.0 | 2.7 | B/1.20 | 3.51 | 84.5 | 9.9 | 85.3 | 4.8 | 28.6 | 71.4 | −44.1 | n.d. | 256.2 |

[a]EP-DVB-A: E: 52.2 mol %, P: 46.5 mol % and divinylbenzene: 1.7 mol %, Mw = 85623, Mn = 39277, PD = 2.18, Tg = −56.5° C.; EP-DVB-B: E: 57.5 mol %, P: 39.4 mol % and divinylbenzene: 3.1 mol %, Mw = 98158, Mn = 41769, PD = 2.35, Tg = −50.7° C.;
[b]The polymer was first extracted by hexane for 24 hrs, and the insoluble portion was further extracted by o-dichlorobenzene;
[c]n.d.: not determined

EXAMPLE 70

Consecutive Graft Reactions of Poly(ethylene-ter-propylene-ter-divinylbenzene) with Styrene and Methylmethacrylate by Transition Metal Coordination and Living Anionic Polymerization Processes Most of EP-DVB-g-s-PS graft copolymers still contain some unreacted DVB units that can be used for the subsequent living anionic graft-from polymerization to incorporate other anionic prepared grafted side chains. In an argon-filled drybox, 2 g of powdery EP-DVB-g-s-PS graft copolymer (obtained from Example 69) was dispersed in 100 ml anhydrous cyclohexane in a 250 ml flask with a magnetic stirrer bar. After adding 1.5 mmol of s-BuLi and 1.5 mmol of TMEDA, the reaction mixture was then heated to 60° C. for 1 hour. The suspension lithiated polymer powders were filtered and repeatedly washed with hexane until the filtrate was completely decolored. The lithiated polymer was then divided to two parts.

One small part (about 0.5 g) was allowed to react with Me₃SiCl to determine the lithiation efficiency. The lithiated polymer was suspended in 30 ml of cyclohexane, before adding 3 ml of Me₃SiCl. The silation reaction was allowed to take place at room temperature with stirring for 1 hour. The resulting polymer was filtered and washed with THF, methanol, water and then methanol, and dried under vacuum. ¹H NMR result shows complete disappearance of olefin units and a new peak at 0.05 ppm, corresponding to methyl protons next to Si. The result clearly showed the effective lithiation reaction of DVB units in EP-DVB-g-s-PS graft copolymers.

The major portion of the lithiated polymer was then used for anionic graft-from reaction, by mixing 1 g of lithiated polymer suspended in 30 ml of cyclohexane with 5 ml of

EXAMPLES 71–81

Graft Copolymers of Poly(ethylene-ter-1-octene-ter-divinylbenzene) and Syndiotactic Polystyrene (s-PS) Prepared by Transition Metal Coordination Polymerization In a 250 ml flask (equipped with a magnetic stirrer bar and under N₂ atmosphere), the indicated quantity (shown in Table 13) of poly(ethylene-ter-1-octene-ter-divinylbenzene) (EO-DVB) was dissolved in 100 ml toluene. Three starting EO-DVB elastomers were studied to compare the effect of DVB concentration to the graft-onto reaction, including sample EO-DVB-A (69.4 mol % ethylene, 28.6 mol % 1-octene, and 2.0 mole % of divinylbenzene; Tg=−57.4° C.; Mw=92,800 and Mn=43,300 g/mol), sample EO-DVB-B (66.8 mol % ethylene, 29.2 mol % 1-octene, and 4.0 mole % of divinylbenzene; Tg=−53.5° C.; Mw=92,500 and Mn=40,600 g/mol), and sample EO-DVB-C (63.8 mol % ethylene, 29.5 mol % 1-octene, and 6.7 mole % of divinylbenzene; Tg=−56.5° C.; Mw=58,900 and Mn=23,400 g/mol). Styrene monomer and MAO (with quantities shown in Table 13) were then added into the homogeneous polymer solution. After stirring the homogeneous solution mixture at 50° C., the graft-onto polymerization reaction was initiated by charging Cp*Ti(OMe)₃ ([MAO]/Ti=1500) catalyst. After 1 hour, 10 ml of isopropanol was added to terminate the graft-onto reaction. The precipitated polymer was filtered and then subjected to a consecutive Soxlet fractionation using hexane and o-dichlorobenzene solvents. Table 13 summarizes the experimental conditions and results. The polymer structure and composition were determined by ¹H and ¹³C NMR, high temperature GPC and DSC studies. In most cases, the conversion of styrene was very high, and only about 10 weight % of hexane-soluble fraction that was the ungrafted EO-DVB terpolymer. Based on the combination of all measurements, the o-dichlorobenzene soluble fraction was graft copolymer (EO-DVB-g-s-PS), containing EO-DVB backbone and s-PS side chains. The GPC curve of each graft copolymer showed a single peak with a narrow molecular distribution, and the molecular weight of graft copolymer was much higher than that of s-PS homopolymer prepared under the same reaction condition (without EO-DVB). In general, the graft efficiency increased with the concentration of DVB units in the starting EO-DVB terpolymer. A broad composition range of graft copolymers, with various ratios of EO-DVB/s-PS, had been prepared. However, a small quantity of insoluble fraction was observed in the product prepared by starting with high EO-DVB concentration.

(57.5 mol % ethylene, 39.4 mol % propylene, and 3.1 mole % of divinylbenzene; Tg=−50.7° C.; Mw=98,200 and Mn=41,800 g/mol). In a 450 ml Parr autoclave equipped with a mechanical stirrer and $N_2$ atmosphere, a desirable quantity (shown in Table 14) of EP-DVB was dissolved in 100 ml toluene. After adding MAO to the polymer solution, the sealed reactor was then saturated with 30 psi ethylene pressure and increased the temperature to 50° C. The $[C_5Me_4(SiMe_2N_tBu)]TiCl_2$ (1.5 umol; [MAO]/[Ti]=1500) catalyst in toluene was then added to initiate the polymerization. Additional ethylene was fed continuously into the reactor by maintaining a constant pressure (30 psi) during the whole course of the polymerization. After 1 hour, 10 ml of isopropanol was added to terminate the graft-onto reac-

TABLE 13

Synthesis of Poly(ethylene-ter-1-octene-ter-divinylbenzene)-g-s-PS graft copolymers by Cp*Ti(OMe)$_3$/MAO catalyst

| | Graft polym. Cond. | | | | Solvent fractionation[b] | | | Graft composition, wt % | | Thermal properties | | |
|---|---|---|---|---|---|---|---|---|---|---|---|---|
| | | | EP- | | ST | wt % | | | | | | |
| Ex. | [Cat] μmol | Styrene g | DVB[a] g | Yield g | conv. % | Hexane soluble | o-DCB soluble | Insoluble | EO-DVB | s-PS | Tg$_1$ ° C. | Tg$_2$ ° C. | Tm ° C. |
| 71 | 5.0 | 4.5 | A/0.71 | 4.64 | 96.6 | 3.5 | 96.5 | 0 | 1.8 | 98.2 | n.d.[c] | 99.2 | 271.2 |
| 72 | 5.0 | 2.7 | A/0.72 | 2.89 | 96.6 | 5.7 | 94.3 | 0 | 3.0 | 97.0 | n.d. | 97.8 | 270.7 |
| 73 | 5.0 | 0.9 | A/0.72 | 1.10 | 91.0 | 15.3 | 84.7 | 0 | 10.6 | 89.4 | −56.5 | 91.2 | 270.2 |
| 74 | 5.0 | 2.7 | A/2.42 | 3.85 | 97.6 | 15.7 | 84.3 | 0 | 17.6 | 82.4 | −52.3 | 92.3 | 267.8 |
| 75 | 5.0 | 4.5 | B/0.71 | 4.33 | 79.7 | 4.1 | 93.0 | 2.9 | 4.7 | 95.3 | n.d. | 98.3 | 266.2 |
| 76 | 5.0 | 2.7 | B/0.68 | 3.21 | 97.9 | 3.6 | 93.0 | 3.4 | 14.0 | 86.0 | n.d. | 95.2 | 261.3 |
| 77 | 5.0 | 0.9 | B/0.71 | 1.35 | 81.0 | 6.0 | 90.0 | 4.0 | 44.0 | 56.0 | −49.7 | 90.1 | 260.5 |
| 78 | 5.0 | 4.5 | C/0.72 | 4.27 | 85.2 | 3.9 | 93.1 | 3.0 | 5.0 | 95.0 | −50.7 | 97.6 | 263.2 |
| 79 | 5.0 | 2.7 | C/0.71 | 2.96 | 88.9 | 4.6 | 91.2 | 4.2 | 13.9 | 86.1 | −50.4 | 92.1 | 254.7 |
| 80 | 5.0 | 1.6 | C/0.71 | 2.01 | 86.0 | 2.5 | 89.2 | 8.3 | 33.8 | 66.2 | −48.1 | n.d. | n.d. |
| 81 | 5.0 | 1.3 | C/1.28 | 2.04 | 84.0 | 11.5 | 80.0 | 8.5 | 43.8 | 56.2 | −44.1 | n.d. | n.d. |

[a]EO-DVB-A: E: 69.4 mol % O: 28.6 mol % and divinylbenzene: 2.0 mol %, Mw = 92861, Mn = 43231, PD = 2.15, Tg = −57.4° C.; EO-DVB E: 66.8 mol %, O: 29.2 mol % and divinylbenzene: 4.0 mol %, Mw = 92440, Mn = 40612, PD = 2.28, Tg = −53.5° C.; EO-DVB-C: E: 63.8 mol %, O: 29.5 mol % and divinylbenzene: 6.7 mol %, Mw = 58864, Mn = 23412, PD = 2.51, Tg = −56.5° C.;
[b]The polymer was first extracted by hexane for 24 hrs, and the insoluble portion was further extracted by o-dichlorobenzene;
[c]n.d.: not determined

EXAMPLES 82–88

Graft Copolymers of Poly(ethylene-ter-propylene-ter-divinylbenzene) with Polyethylene Prepared by Transition Metal Coordination Polymerization Two starting poly(ethylene-ter-propylene-ter-divinylbenzene) (EP-DVB) polymers were studied to understand the effect of DVB concentration on the graft reaction, including sample EP-DVB-A (52.2 mol % ethylene, 46.5 mol % propylene, and 1.7 mole % of DVB; Tg=−56.5° C.; Mw=85,600 and Mn=39,300 g/mol) and sample EP-DVB-B tion. The precipitated polymer was filtered and then subjected to a consecutive Soxlet fractionation using pentane and xylene solvents. Table 14 summarizes the experimental conditions and results. The polymer structure and composition were determined by $^1$H NMR, high temperature GPC and DSC studies. In most cases, the incorporation of ethylene was very high, and only few weight % of pentane-soluble fraction that was the ungrafted EP-DVB terpolymer. The rest of polymer was soluble in hot xylene, which was EP-DVB-g-PE graft copolymer. There was almost no insoluble fraction

TABLE 14

Synthesis of Poly(ethylene-ter-propylene-ter-divinylbenzene)-g-PE graft copolymer by [C$_5$Me$_4$(SiMe$_2$NtBu)]TiCl$_2$/MAO catalyst

| | Graft polym. cond. | | | Solvent fractionation[b] wt % | | | Graft composition wt % | | Thermal properties | |
|---|---|---|---|---|---|---|---|---|---|---|
| Ex. | Ethylene psi | EP-DVB[a] g | Yield g | Pentane soluble | Xylene soluble | Insoluble | EP-DVB | PE | Tg ° C. | Tm ° C. |
| 82 | 30 | A/0.35 | 6.2 | 4.0 | 96.0 | 0 | 2.3 | 97.7 | −57.0 | 131.0 |
| 83 | 30 | A/0.76 | 5.8 | 6.7 | 93.3 | 0 | 7.0 | 93.0 | −56.0 | 131.3 |
| 84 | 30 | A/1.25 | 5.5 | 8.8 | 89.7 | n.d.[c] | 13.7 | 86.3 | −57.8 | 128.5 |

TABLE 14-continued

Synthesis of Poly(ethylene-ter-propylene-ter-divinylbenzene)-g-
PE graft copolymer by [C$_5$Me$_4$(SiMe$_2$NtBu)]TiCl$_2$/MAO catalyst

| | Graft polym. cond. | | | Solvent fractionation[b] wt % | | | Graft composition wt % | | Thermal properties | |
|---|---|---|---|---|---|---|---|---|---|---|
| Ex. | Ethylene psi | EP-DVB[a] g | Yield g | Pentane soluble | Xylene soluble | Insoluble | EP-DVB | PE | Tg °C. | Tm °C. |
| 85 | 30 | B 0.41 | 7.1 | 1.6 | 98.4 | 0 | 4.4 | 95.6 | −51.3 | 130.1 |
| 86 | 30 | B/0.80 | 4.9 | 3.3 | 96.7 | n.d. | 13.8 | 86.2 | −51.5 | 126.4 |
| 87 | 30 | B/1.24 | 4.5 | 3.8 | 94.6 | 1.6 | 25.0 | 75.0 | −50.9 | 124.5 |
| 88 | 30 | B/2.44 | 4.3 | 4.0 | 93.3 | 2.7 | 54.8 | 45.2 | −52.5 | 121.7 |

[a]EP-DVB-A: E: 52.2 mol %, P: 46.5 mol % and divinylbenzene: 1.7 mol %, Mw = 85623, Mn = 39277, PD = 2.18, Tg = −56.5° C.; EP-DVB-B: E: 57.7 mol %, P: 39.4 mol % and divinylbenzene: 3.1 mol % Mw = 98158, Mn = 41769, PD = 2.35, Tg = −50.7° C.;
[b]The polymer was first extracted by pentane for 24 hrs, and the insoluble portion was further extracted by xylene;
[c]n.d.: not determined.

EXAMPLES 89–92

Graft Copolymers of Poly(ethylene-ter-propylene-ter-divinylbenzene) and Polypropylene Prepared by Transition Metal Coordination Polymerization In a 450 ml Parr autoclave equipped with a mechanical stirrer and N$_2$ atmosphere, 2.6 g of EP-DVB terpolymer (52.1 mol % ethylene, 43.7 mol % propylene, and 4.2 mole % of DVB; Tg=−48.7° C.; Mw=68,500 and Mn=34,200 g/mol) was dissolved in 100 ml toluene. After adding MAO to the polymer solution, the sealed reactor was then saturated with 20 psi propylene pressure with or without hydrogen (shown in Table 15). After increasing the solution temperature to 50° C., rac-Me$_2$Si(2-Me-4-Phenylindenyl)ZrCl$_2$ (1.25 umol; [MAO]/[Ti]=1500) catalyst in toluene was then added to the reactor to initiate the polymerization. Additional propylene and hydrogen were fed continuously into the reactor by maintaining the constant pressure during the whole course of the polymerization. After 1 hour, 10 ml of isopropanol was added to terminate the graft-onto reaction. The precipitated polymer was filtered and then subjected to a consecutive Soxlet fractionation using pentane and xylene solvents. Table 15 summarizes the experimental conditions and results. The polymer structure and composition were determined by $^1$H NMR, high temperature GPC and DSC studies. There was no insoluble fraction. The catalyst activity and incorporation of propylene to graft copolymer were very dependant on the hydrogen pressure. A high concentration of isotactic polypropylene can be incorporated into EP-DVB terpolymer.

TABLE 15

Synthesis of Poly(ethylene-ter-propylene-ter-divinylbenzene)-g-PP
graft copolymers by rac-Me$_2$Si(2-Me-4-Phenylindenyl)ZrCl$_2$/MAO catalyst

| | Graft polym. cond. | | | | | Solvent fractionation[b] | | | | | | |
|---|---|---|---|---|---|---|---|---|---|---|---|---|
| | | EP- | | | | | Wt % | | Graft | | | |
| Examples | Propane Psi | DVB[a] g | H$_2$ psi | Yield g | Activity kgPP/molZr · hr | Pentane soluble | Xylene Soluble | Insoluble | composition wt % EP-DVB | PP | Tg °C. | Tm °C. |
| 89 | 20 | 2.6 | 0 | 2.5 | 0 | 100 | 0 | 0 | — | — | — | — |
| 90 | 20 | 2.6 | 2 | 4.9 | 1864 | 29.4 | 70.6 | 0 | 32.3 | 67.7 | −47.3 | 152.0 |
| 91 | 20 | 2.6 | 6 | 6.56 | 3184 | 13.0 | 87.0 | 0 | 30.5 | 69.5 | −47.1 | 151.4 |
| 92 | 20 | 2.6 | 12 | 7.79 | 4128 | 7.9 | 92.1 | 0 | 28.5 | 71.5 | −46.5 | 151.5 |

[a]EP-DVB: E: 52.1 mol %, P: 43.7 mol % and divinylbenzene: 4.2 mol %, Mw = 68524, Mn = 34178, PD = 2.09, Tg = −48.7° C.;
[b]The polymer was first extracted by pentane for 24 hrs, and the insoluble portion was further extracted by xylene.

EXAMPLE 93

Graft Copolymers of Poly(ethylene-ter-propylene-ter-divinylbenzene) And Polystyrene Prepared by Free Radical Polymerization In a 250 ml flask equipped with a stirrer and N$_2$ atmosphere, 3.1 g of EP-DVB terpolymer (50.1 mol % ethylene, 47.0 mol % propylene, and 2.9 mole % of DVB) was dissolved in 100 ml benzene. After adding 4.5 g of styrene monomer and 0.25 g of benzoyl peroxide (BPO) free radical initiator to the polymer solution, the homogeneous solution was then heated step-wise, to 50° C. for 3 hours, 75° C. for 2 hours and 80° C. for 3 hours, to initiate the free radical graft-onto reaction. The reaction was terminated by adding 50 ml of isopropanol. The precipitated polymer was filtered and then subjected to fractionation by hexane. The ungrafted EP-DVB polymer was found to be 0.28 g. About 7.01 g of graft copolymer, with 42 wt % EP-DVB backbone and 58 wt % polystyrene side chains, was obtained, based on $^1$H NMR analysis.

EXAMPLE 94

Graft Copolymer of Poly(ethylene-ter-propylene-ter-divinylbenzene) and Poly(methylmethacrylate) Prepared by Free Radical Polymerization

In a 250 ml flask equipped with a stirrer and $N_2$ atmosphere, 2.9 g of EP-DVB terpolymer (50.1 mol % ethylene, 47.0 mol % propylene, and 2.9 mole % of DVB) was dissolved in 100 ml benzene. After adding 5.4 methylmethacrylate monomer and 0.25 g of benzoyl peroxide (BPO) free radical initiator to the polymer solution, the homogeneous solution was then heated to initiate the free radical graft-onto reaction, at 50° C. for 3 hours, 75° C. for 2 hours and 80° C. for 3 hours. Adding 50 ml of isopropanol terminated the reaction. The precipitated polymer was filtered and then subjected to fractionation by hexane. Only 0.2 g of hexane-soluble ungrafted EP-DVB polymer fraction was observed. About 7.6 g of graft copolymer, with 36.5 wt % EP-DVB backbone and 63.5 wt % poly(methylmethacrylate) side chains, was obtained, based on $^1$H NMR analysis.

EXAMPLE 95

Graft Copolymer of Poly(ethylene-co-divinylbenzene) and Polystyrene Prepared by Free Radical Polymerization

In a 250 ml flask equipped with a stirrer and $N_2$ atmosphere, 3 g of poly(ethylene-co-divinylbenzene) containing 1.73 mole % of DVB was dissolved in 200 g biphenyl solvent at 125° C. After adding 4.5 g of styrene monomer, 0.3 g of dicumyl peroxide (DCP) free radical initiator was introduced into the reactor to initiate the free radical graft-onto reaction. The reaction was taken place between 125–130° C. for 5 hours before being terminated by adding 50 ml of isopropanol. The precipitated polymer was filtered and washed repeatedly with isopropanol, then dried in vacuum oven to obtain 6.8 g polymer. The resulting polymer was fractionated by THF into 2.5 g THF-soluble ungrafted polystyrene and 4.3 g PE-g-PS graft copolymer containing 60 wt % polyethylene and 40 wt % polystyrene, based $^1$H NMR analysis.

EXAMPLE 96

Graft Copolymer of Poly(propylene-codivinylbenzene) Polystyrene Prepared by Free Radical Polymerization

In a 250 ml flask equipped with a stirrer and $N_2$ atmosphere, 3 g of poly(propylene-co-divinylbenzene) containing 0.94 mole % of DVB was dissolved in 200 g biphenyl solvent at 130° C. After adding 4.5 g of styrene monomer, 0.3 g of dicumyl peroxide (DCP) free radical initiator was introduced into the reactor to initiate the free radical graft-onto reaction. The reaction was continued at 130° C. for 5 hours before being terminated by adding 50 ml of isopropanol. The precipitated polymer was filtered and washed repeatedly with isopropanol, then dried in vacuum oven to obtain 6.9 g polymer. The resulting polymer was fractionated by THF into 3.2 g THF-soluble ungrafted polystyrene and 3.7 g PP-g-PS graft copolymer containing 70 wt % PP and 30 wt % PS, based $^1$H NMR analysis.

What is claimed is:

1. Functionalized polyolefins and graft copolymers (II) having the structural formula

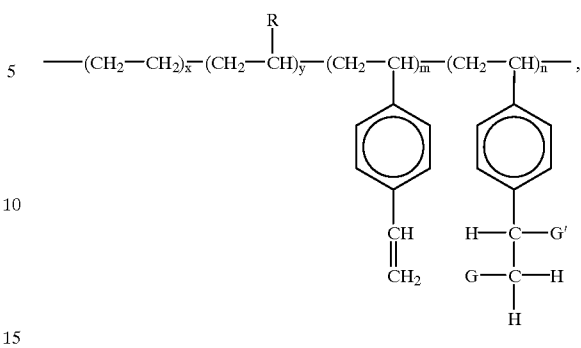

in which: R is a member selected from alkyl groups, cyclic aliphatic groups and aromatic groups; G and G', independently, are selected from —H, —OH, epoxy, —NH$_2$, —COOH, anhydride, —Cl, —Br, —M, —COOM (wherein M=metal) and a polymer chain having molecular weight of at least about 500; x is $\geq 0$; y is $\geq 0$; m is $\geq 0$; n is at least 0.05%; the combined alpha-olefin mole % (x+y) is from about 50 to 99.9%; the sum of x, y, m and n is 100%; and the backbone polymer chain has a number average molecular weight (Mn) of at least about 1,000; said copolymers (II) being derived from linear polyolefin copolymers (I) that (a) comprises alpha-olefin and divinylbenzene comonomer units, (b) has a linear molecular structure with an unsaturation/divinylbenzene (TUS/DOU) mole ratio from about 0.8 to 1.1, (c) has a ratio of weight average molecular weight (Mw) to number average molecular weight, Mw/Mn, less than about 4, and (d) has narrow composition distribution with the incorporated divinylbenzene units being distributed homogeneously along the polyolefin chains.

2. The copolymer (II) of claim 1, where y is 0%, x is greater than 60% and the backbone of the copolymer (II) is polyethylene having a number average molecular weight (Mn) of at least about 10,000.

3. The copolymer (II) of claim 1, where R is a methyl group, x is 0%, y is between 85 and 99.9%, and the backbone of the copolymer (II) is an isotactic polypropylene structure having a number average molecular weight (Mn) of at least about 10,000.

4. The copolymer (II) of claim 1, where R is a C$_6$ alkyl group, x is 0%, y is greater than 60%, and the backbone of the copolymer (II) is poly(1-octene) having a number average molecular weight (Mn) of at least about 10,000.

5. The copolymer (II) of claim 1, where R is methyl group, x is at least about 40%, y is at least about 30%, the sum of x+y is between 85 and 99.9%, and the backbone of copolymer (II) is an EP elastomer having a number average molecular weight (Mn) of at least about 10,000.

6. The copolymer (11) of claim 1, where R is a C$_6$ alkyl group, x is at least about 40%, y is at least about 30%, and the backbone of copolymer (II) is an ethylene/1-octene elastomer having a number average molecular weight (Mn) of at least about 10,000.

7. The copolymer (II) of claim 1, where G and G', independently, are polyethylene having a number average molecular weight (Mn) of at least about 1,000.

8. The copolymer (II) of claim 1, where G and G', independently, are isotactic polypropylene having a number average molecular weight (Mn) of at least about 10,000.

9. The copolymer (II) of claim 1, where G and G', independently, are isotactic polybutene having a number average molecular weight (Mn) of at least about 10,000.

10. The copolymer (II) of claim 1, where G and G', independently, are syndiotactic polystyrene having a number average molecular weight (Mn) of at least about 5,000.

11. The copolymer (II) of claim 1, where at least one of G and G' comprises a polymer or copolymer of a transition metal polymerizable monomer selected from the group consisting of ethylene, propylene, 1-butene, 1-hexene, 1-octene, styrene, p-methylstyrene, p-chlorostyrene, norbornene and norbornene derivatives, and mixtures thereof.

12. The copolymer (II) of claim 1, where G and G', independently, are selected from the group consisting of polymers and copolymers of anionically polymerizable monomers.

13. The copolymer (II) of claim 12, wherein said anionically polymerizable monomers are selected from the group consisting of styrene, butadiene, isoprene, alkyl acrylates, alkyl methacrylates, vinyl unsaturated amides, methacrylonitrile, acrylonitrile, vinyl pyridienes, and mixtures thereof.

14. The copolymer (II) of claim 1, where G and G', independently, are selected from the group consisting of polymers and copolymers of free radically polymerizable monomers.

15. The copolymer (II) of claim 14, wherein said free radically polymerizable monomers are selected from the group consisting of ethylene, styrene, vinyl chloride, acrylates, methacrylates, vinyl acetate, acrylamides, acrylonitrile and mixtures thereof.

16. The copolymer (II) of claim 1, where G and G'; independently, are selected from the group consisting of polymers and copolymers of cationically polymerizable monomers.

17. The copolymer (II) of claim 1, where at least one of G and G' include a linked nucleophilic residue and a polymer chain selected from anionically ring-openable monomers, cationically ring-openable monomers, and oxidatively coupleable monomers.

18. The copolymer (II) of claim 17, wherein said anionically and cationically ring-openable monomers are selected from the group consisting of cyclic ethers, sulfides, lactones, lactams and n-carboxyanhydride.

19. A processes for preparing a graft copolymer (II) having the structural formula

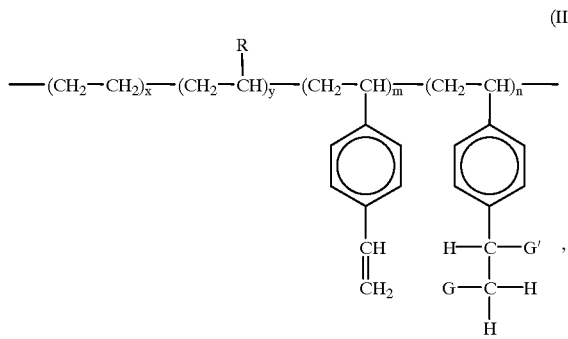

in which: R is a $C_1$ to $C_{10}$ linear or branched alkyl group or a $C_6$ to $C_{10}$ substituted or unsubstituted aromatic group; G and G', independently, are selected from —H[, —OH, epoxy, —NH$_2$, —COOH, anhydride, —Cl, —Br, —M, —COOM (wherein M=metal)] and a polymer chain having the molecular weight of at least about 500; x is $\geq 0$; y is $\geq 0$; m is $\geq 0$; n is at least 0.05%, with the proviso that at least one of G and G' comprises a polymer chain; the combined alpha-olefin mole % (x+y) is from about 50 to 99.9%; the sum of x, y, m and n is 100%; and the backbone polymer chain has a number average molecular weight (Mn) of at least about 1,000; which comprises:

contacting under polymerization reaction conditions a monomer capable of undergoing polymerization in the presence of a transition metal coordination catalyst with (a) a transition metal coordination catalyst, (b) an activating co-catalyst, and (c) a divinylbenzene comonomer unit-containing linear polyolefin copolymer (I) having the formula

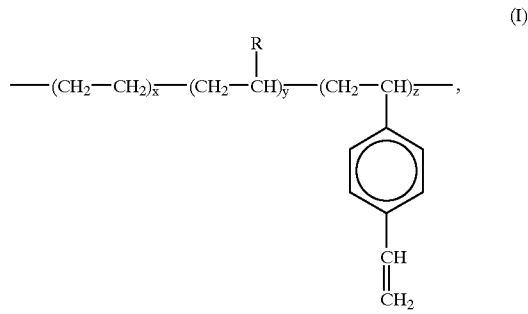

in which: R is a $C_1$ to $C_{10}$ linear or branched alkyl group or a $C_6$ to $C_{10}$ substituted or unsubstituted aromatic group; x is $\geq 0$; y is $\geq 0$; the combined alpha-olefin mole % (x+y) is from about 50 to 99.9%; and the sum of x, y, and z is 100%; and in which the backbone polymer chain has a number average molecular weight (Mn) of at least about 1,000, a ratio of weight average molecular weight (Mw) to number average molecular weight (Mw/Mn) less than about 4, a linear molecular structure, and a narrow composition distribution with the incorporated divinylbenzene units being distributed homogeneously along the backbone polymer chains.

20. The process of claim 19, wherein the polymerizable monomer, the catalyst, the co-catalyst and the copolymer (I) are contacted in an inert diluent under suspension polymerization reaction conditions.

21. The process of claim 19, wherein the polymerizable monomer, the catalyst, the co-catalyst and the copolymer (I) are contacted in an inert solvent under homogeneous solution polymerization reaction conditions.

22. The process of claim 19, wherein the catalyst that is employed is a transition metal coordination catalyst system comprising a metallocene coordination compound and a noncoordinating anion.

23. The process of claim 19, wherein said metallocene compound comprises a titanocene or zirconocene compound having at least one cyclopentadienyl moiety.

* * * * *